United States Patent
Lee et al.

(10) Patent No.: US 9,324,379 B2
(45) Date of Patent: Apr. 26, 2016

(54) MOBILE TERMINAL AND CONTROLLING METHOD THEREOF

(71) Applicant: LG ELECTRONICS INC., Seoul (KR)

(72) Inventors: Taeyeon Lee, Seoul (KR); Yung Kim, Seoul (KR); Hyedeuk Lee, Seoul (KR); Jungmin Lee, Seoul (KR); Jeongeun Choi, Seoul (KR); Huran Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 14/274,586

(22) Filed: May 9, 2014

(65) Prior Publication Data
US 2014/0334797 A1  Nov. 13, 2014

(30) Foreign Application Priority Data

May 10, 2013  (KR) .................. 10-2013-0052929
Nov. 8, 2013   (KR) .................. 10-2013-0135219

(51) Int. Cl.
*H04N 9/80*   (2006.01)
*G11B 27/28*  (2006.01)
*G06F 17/30*  (2006.01)

(52) U.S. Cl.
CPC .......... *G11B 27/28* (2013.01); *G06F 17/30843* (2013.01)

(58) Field of Classification Search
CPC .................. G11B 27/28; G06F 17/30843
USPC .................. 386/200, 241, 239, 278, 281
See application file for complete search history.

(56) References Cited

U.S. PATENT DOCUMENTS

| 8,571,330 B2 * | 10/2013 | Gao ............... G06F 17/30781 |
| | | 348/333.05 |
| 2007/0065044 A1 | 3/2007 | Park et al. |
| 2007/0168867 A1 | 7/2007 | Hiroi et al. |
| 2012/0293687 A1 | 11/2012 | Karn et al. |

FOREIGN PATENT DOCUMENTS

| EP | 1465196 | 10/2004 |
| WO | 2008/127537 | 10/2008 |
| WO | 2011/149648 | 12/2011 |

OTHER PUBLICATIONS

European Patent Office Application Serial No. 14167566.0, Search Report dated Oct. 8, 2014, 10 pages.
European Patent Office Application Serial No. 14167566.0, Office Action dated Dec. 8, 2015, 5 pages.

* cited by examiner

*Primary Examiner* — Robert Chevalier
(74) *Attorney, Agent, or Firm* — Lee, Hong, Degerman, Kang & Waimey PC; Jonathan Kang; Justin Lee

(57) ABSTRACT

A mobile terminal providing a thumbnail enabling overall content of a video to be previewed and a controlling method thereof are disclosed. The mobile terminal includes a memory, a display, and a controller for selecting a plurality of video frames of the video to create a plurality of representative images, creating a representative thumbnail image of the video comprising at least the plurality of representative images, and displaying the representative thumbnail image to correspond to the video.

18 Claims, 46 Drawing Sheets

FIG. 14
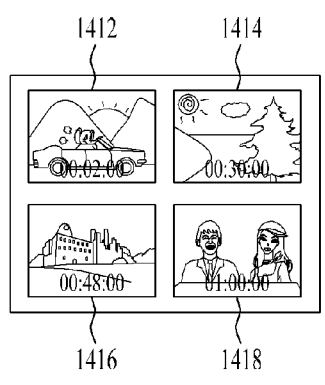
(a)
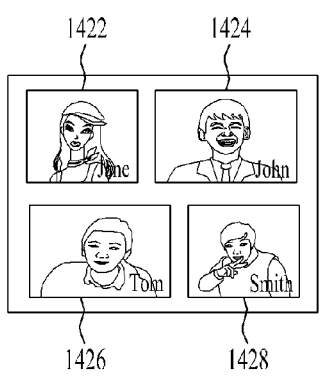
(b)
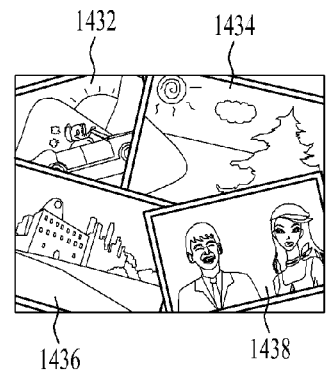
(c)
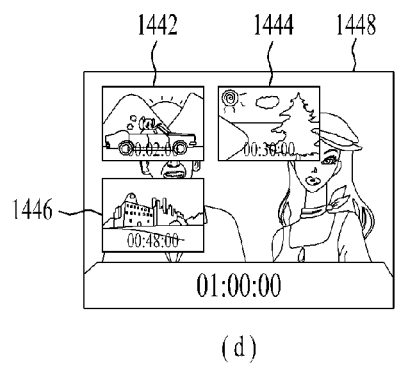
(d)

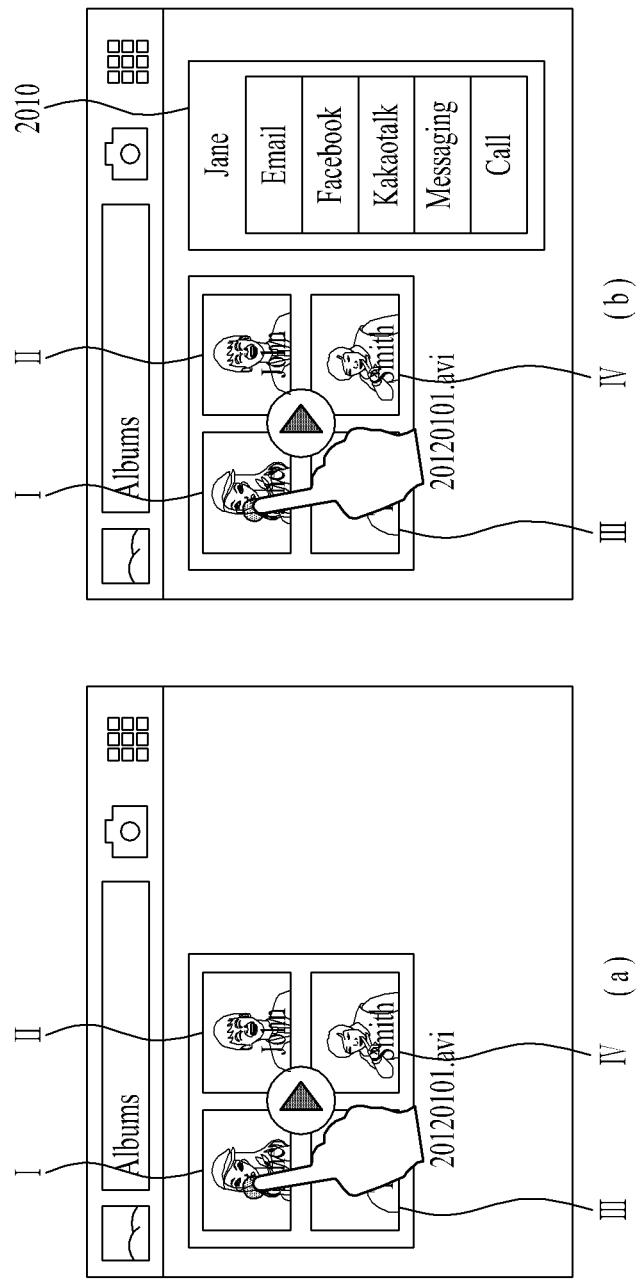

FIG. 21
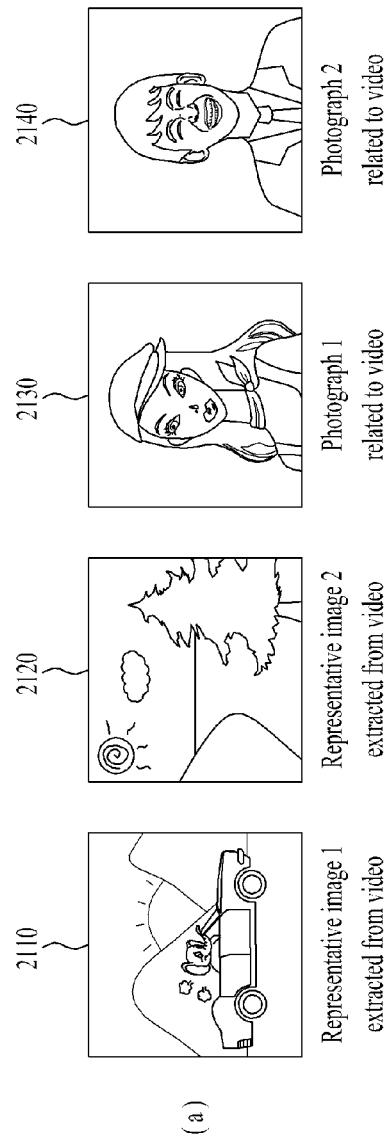
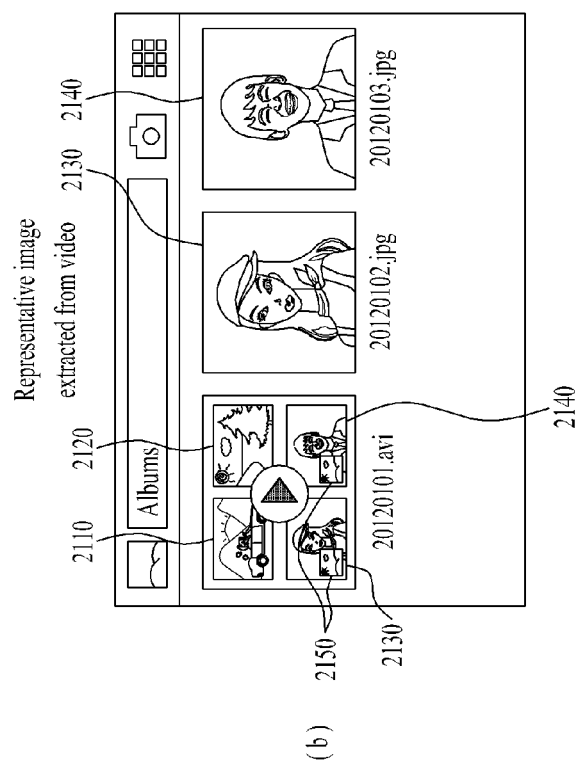

FIG. 28
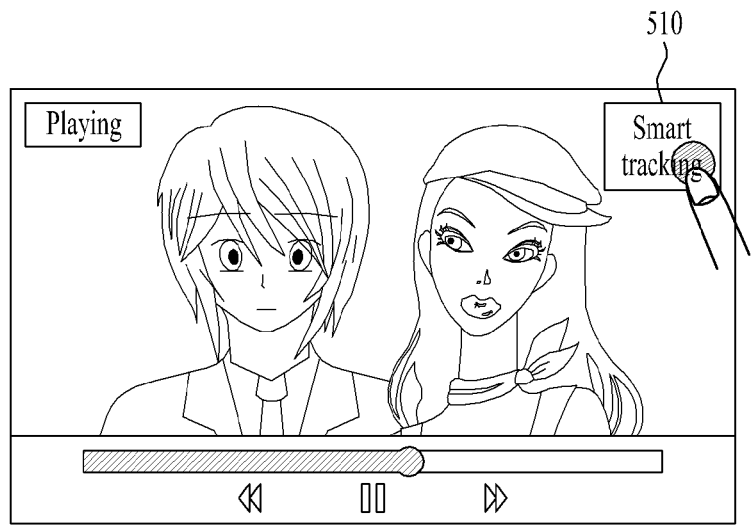
(a)
(b)

FIG. 29
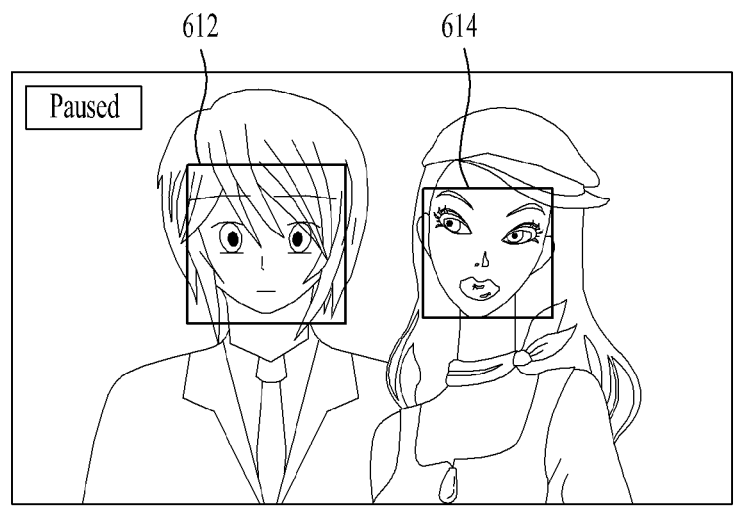
(a)
(b)

FIG. 30
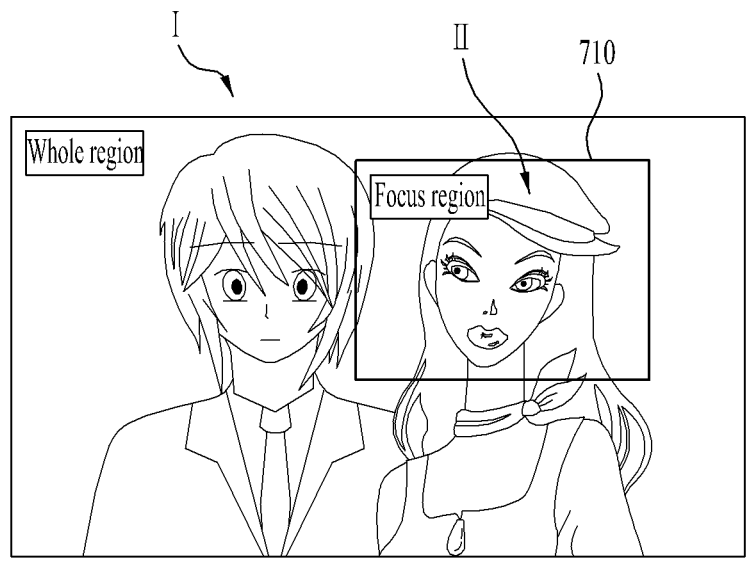
(a)
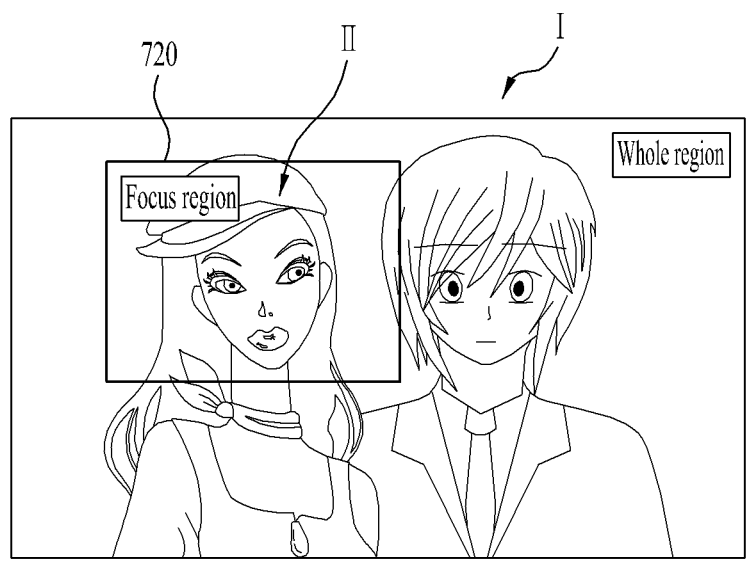
(b)

FIG. 31
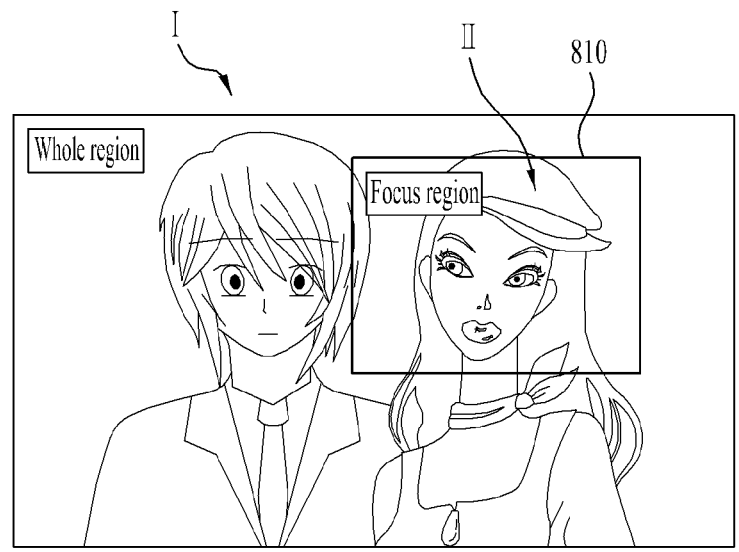
(a)
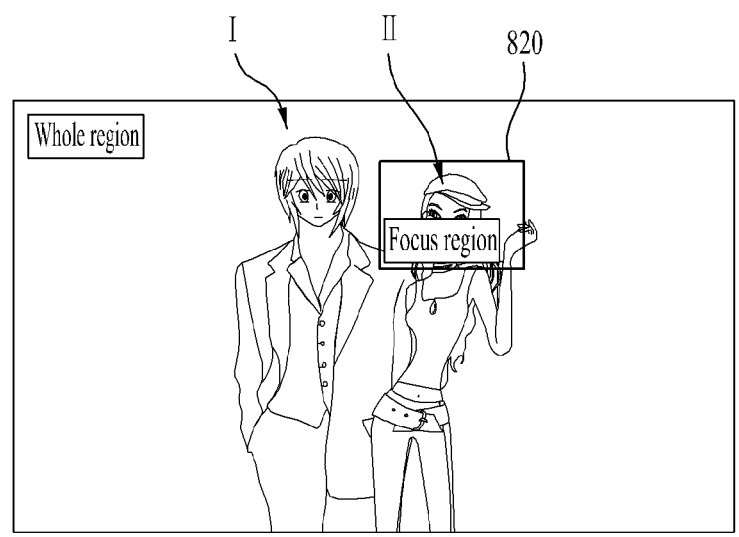
(b)

FIG. 32
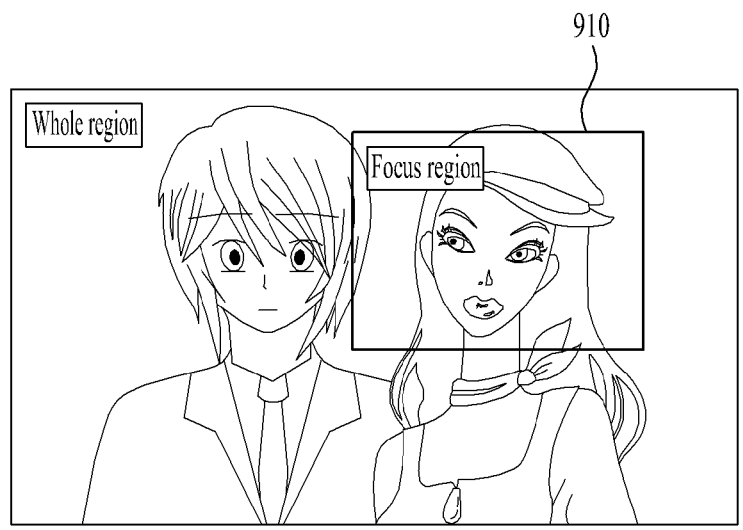
(a)
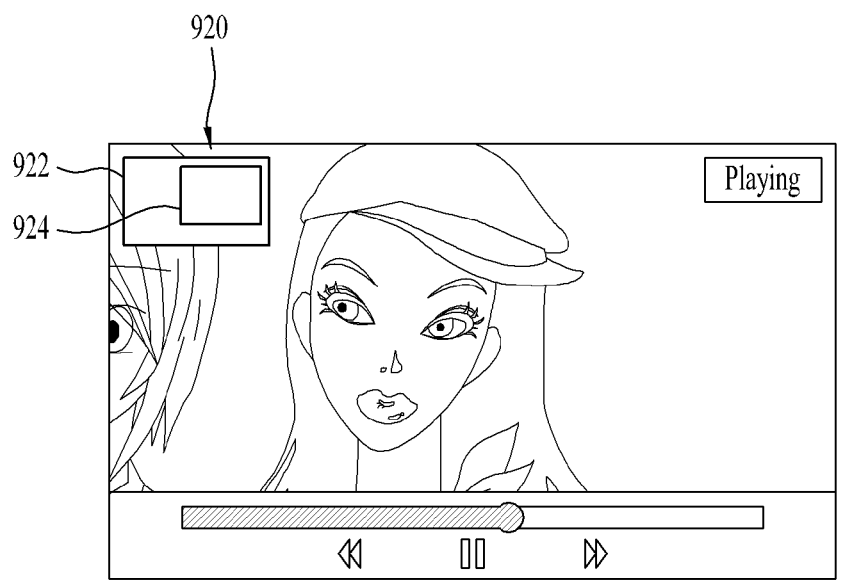
(b)

FIG. 33
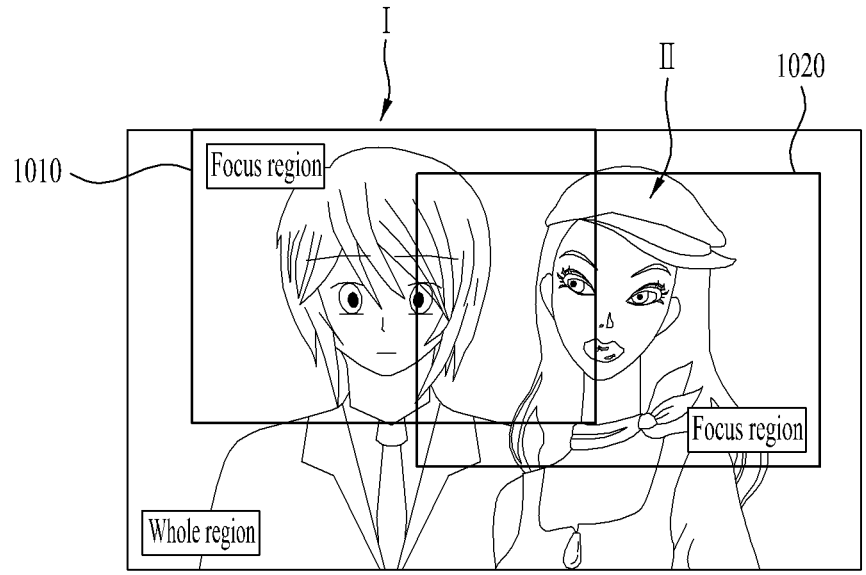
(a)
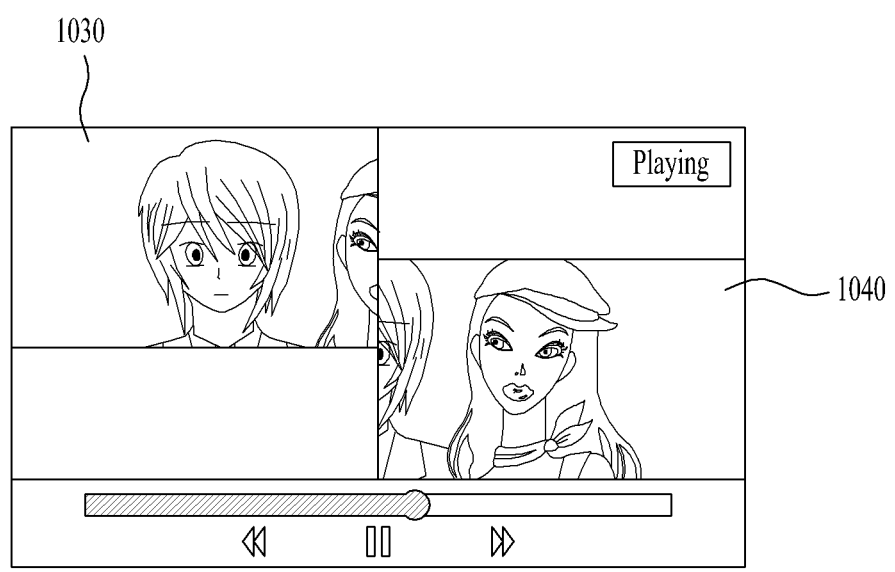
(b)

FIG. 36
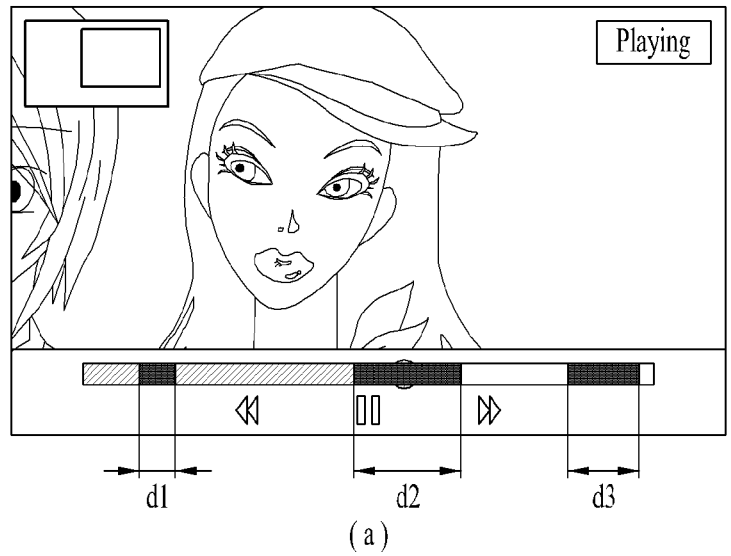
(a)
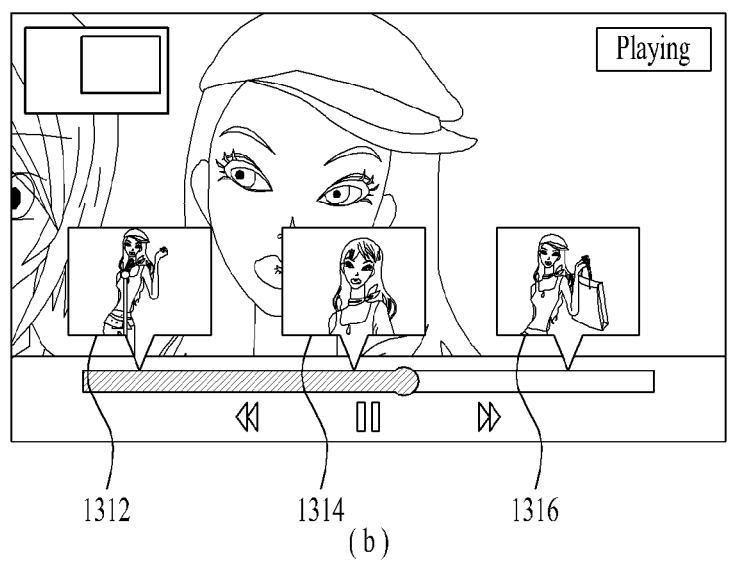
(b)

FIG. 37
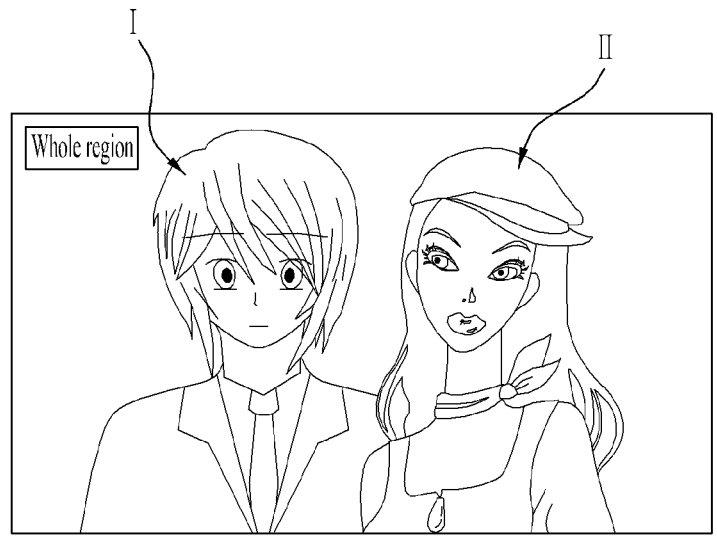
(a)
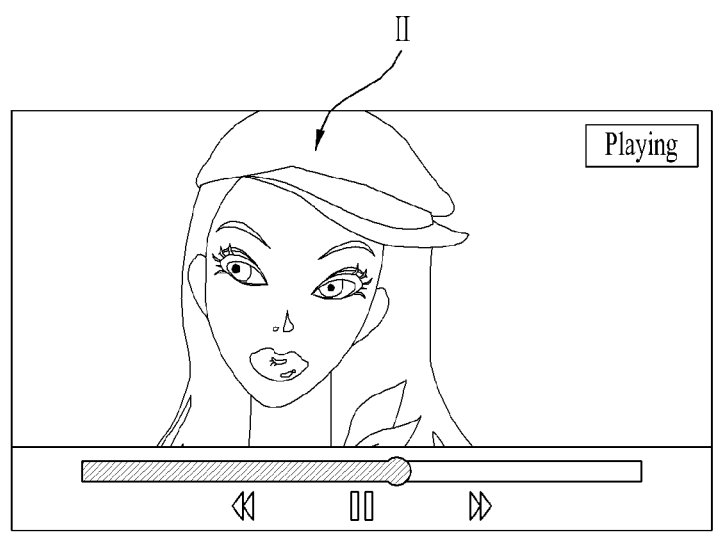
(b)

FIG. 38
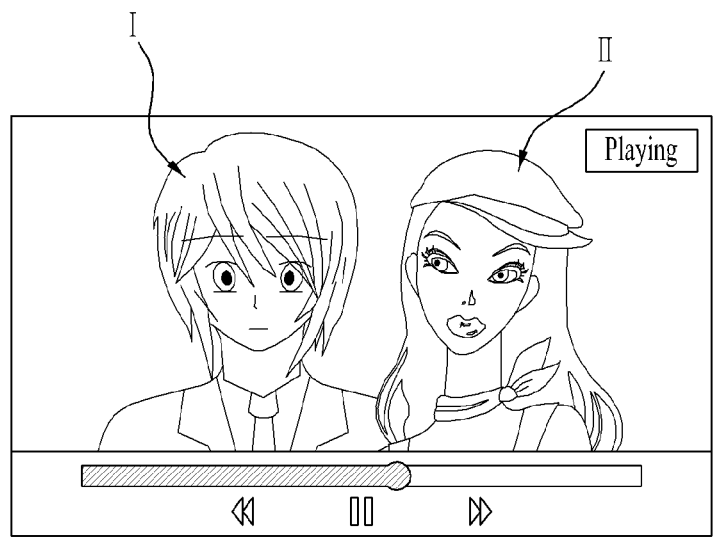
(a)
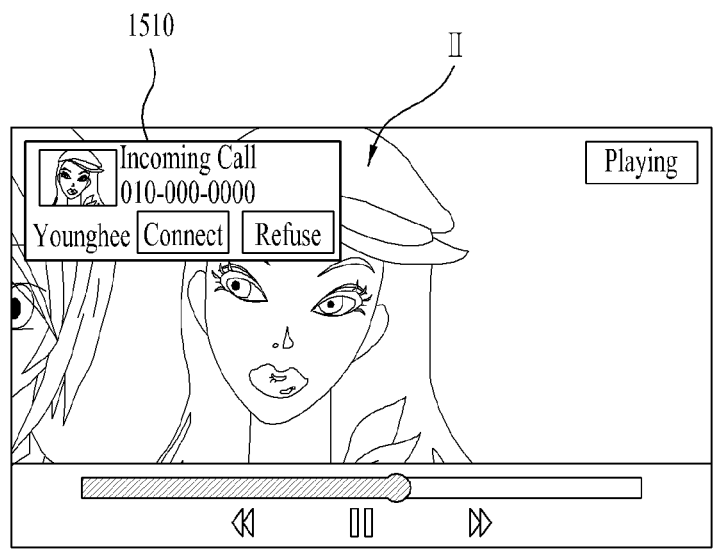
(b)

FIG. 40
(a)
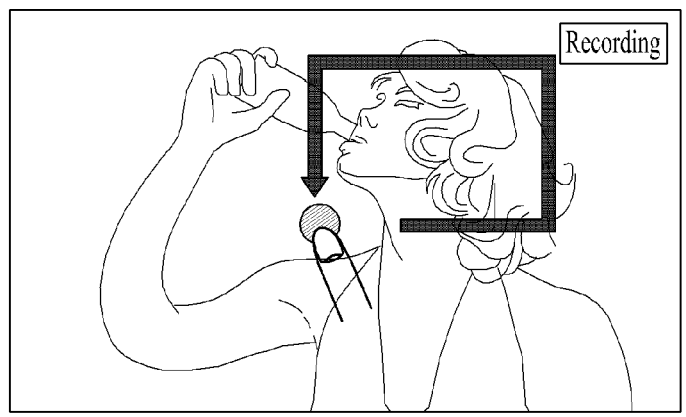
(b)
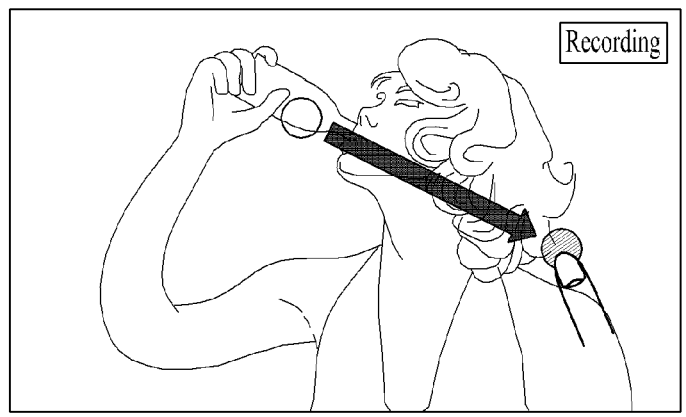
(c)

FIG. 41
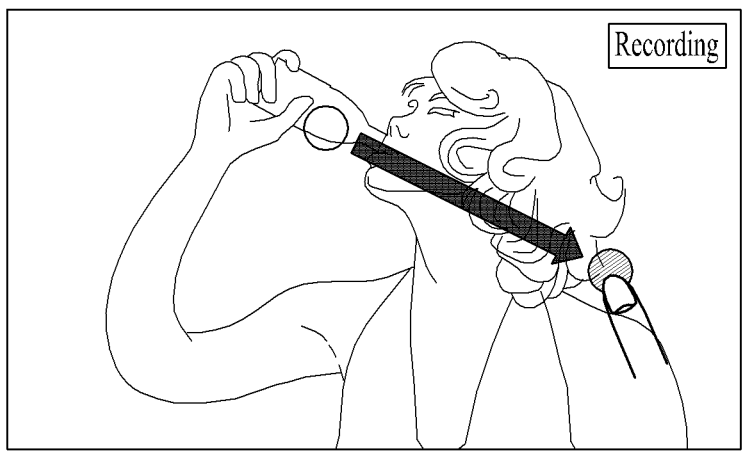
(a)
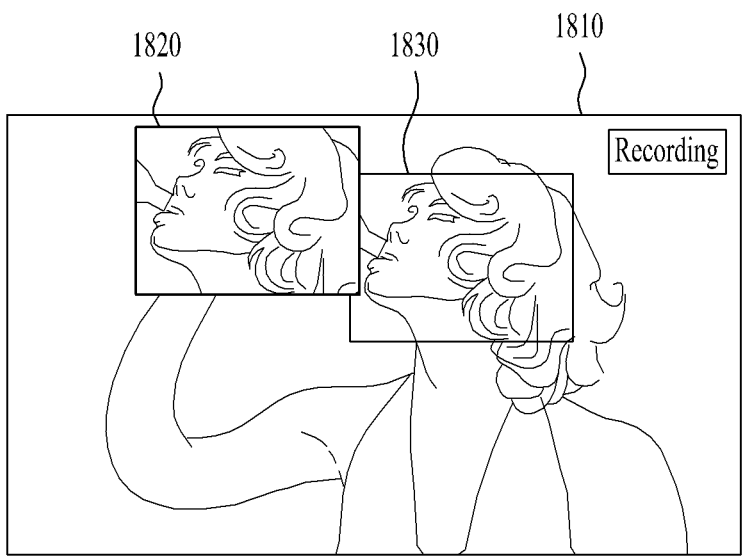
(b)

FIG. 42
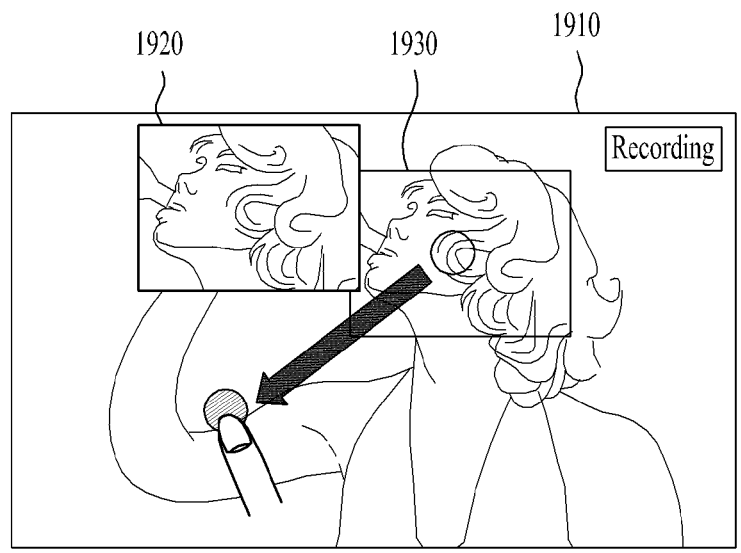
(a)
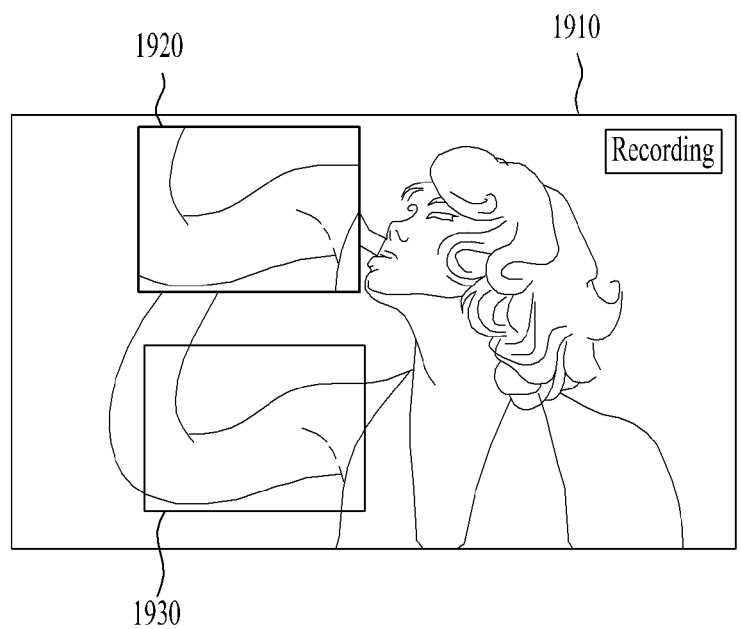
(b)

FIG. 43
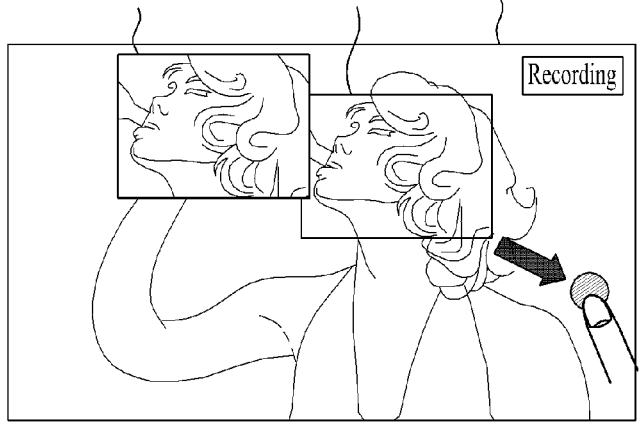
(a)
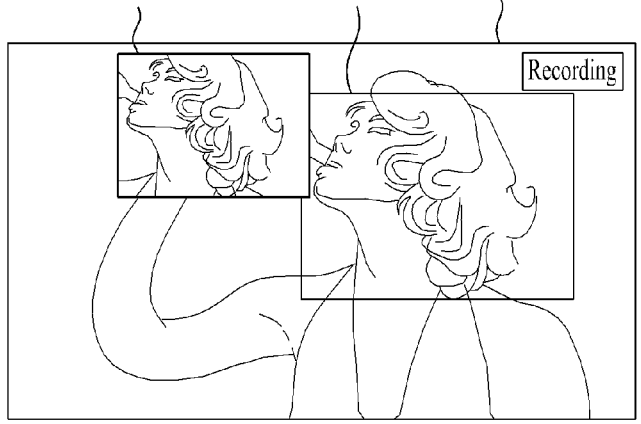
(b)
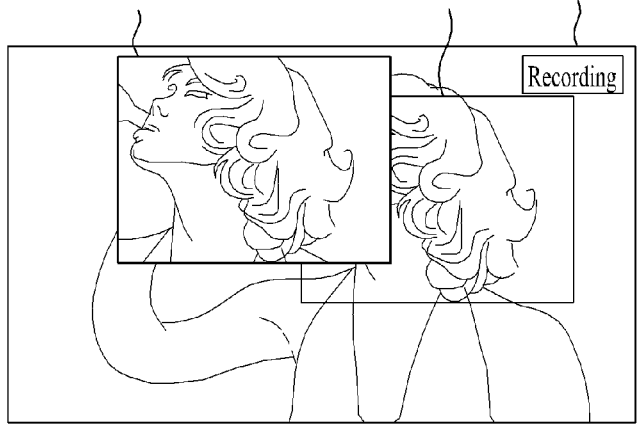
(c)

MOBILE TERMINAL AND CONTROLLING METHOD THEREOF

Pursuant to 35 U.S.C. §119(a), this application claims the benefit of earlier filing date and right of priority to Korean Application No. 10-2013-0052929, filed on May 10, 2013 and Korean Application No. 10-2013-0135219, filed on Nov. 8, 2013, the contents of which are hereby incorporated by reference herein in their entireties.

BACKGROUND OF THE INVENTION

1. Field of the Invention

The present invention relates to a mobile terminal that is capable of creating a thumbnail including a plurality of representative images and a controlling method thereof.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Viewing video or photographs on a mobile terminal is one of the popularized functions. As a large number of multimedia files, such as video or images, are handled by the mobile terminal, there is a high necessity for an index function that is capable of searching for videos or photographs desired by a user from a large number of multimedia files.

Generally, thumbnails are displayed together with file names when videos or images are displayed for user convenience during searching. Since an image comprises a still image, the content of the image may be recognized by viewing only a thumbnail of the image. However, since videos include a plurality of successive frames, there is problem in recognizing content of the video only using a single thumbnail image.

SUMMARY OF THE INVENTION

Accordingly, embodiments of the present invention are directed to a mobile terminal and controlling method thereof that substantially obviate one or more problems due to limitations and disadvantages of the related art.

The present invention has been made in view of the above problems, and it is an object of the present invention to provide a mobile terminal with improved user convenience.

Specifically, it is an object of the present invention to provide a mobile terminal that is capable of providing a thumbnail representing a video allowing the overall content of video to be previewed.

To achieve these objects and other advantages and in accordance with the purpose of the invention, as embodied and broadly described herein, a mobile terminal includes a memory for storing video, a display for outputting the video and a thumbnail of the video, and a controller for playing the video and creating a plurality of representative images from the video to create the thumbnail. The controller may combine the representative images to create the thumbnail.

In another aspect of the present invention, a controlling method of a mobile terminal includes creating a plurality of representative images from video and combining the representative images to create a thumbnail of the video and displaying the created thumbnail.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 14 is a diagram illustrating a thumbnail containing a plurality of representative images;

FIG. 20 is a diagram showing an example in which a screen is displayed to communicate with another person or party corresponding to a representative image selected by a touch;

FIG. 21 is a diagram showing an example in which a representative image of video and a representative image of a photograph related to the video are combined to create a thumbnail of the video;

FIGS. 28(a) and 28(b) are diagrams illustrating an example in which a video is paused in response to user input to enable a tracking function;

FIGS. 29(a) and 29(b) are diagrams illustrating an example in which candidate objects that can be set as a target object are visually distinguished;

FIGS. 30(a) and 30(b) are diagrams illustrating an example in which at least a portion of a video is set as a focus region;

FIGS. 31(a) and 31(b) are diagrams illustrating an example in which the size of a focus region is changed;

FIGS. 32(a) and 32(b) are diagrams illustrating an example in which a miniature map indicating a location of the focus region is output;

FIGS. 33(a) and 33(b) are diagrams illustrating the output of a touchscreen when a plurality of target objects is set;

FIGS. 36(a) and 36(b) are diagrams illustrating an example in which an appearance of a target object or a period during which the target object appears is displayed on a progress display bar;

FIGS. 37(a) and 37(b) are diagrams illustrating an example in which a target object extracted from a video is displayed;

FIGS. 38(a) and 38(b) are diagrams illustrating an example in which another party related to an event generated at the mobile terminal is automatically set as a target object;

FIGS. 40(a) to 40(c) are diagrams illustrating an example of a user input to set a focus region during video recording;

FIGS. 41(a) and 41(b) are diagrams illustrating an example in which a sub playing window is displayed on a main playing window;

FIGS. 42(a) and 42(b) are diagrams illustrating an example in which the position of a focus region is changed;

FIGS. 43(a) to 43(c) are diagrams illustrating an example in which the size of a focus region is changed.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
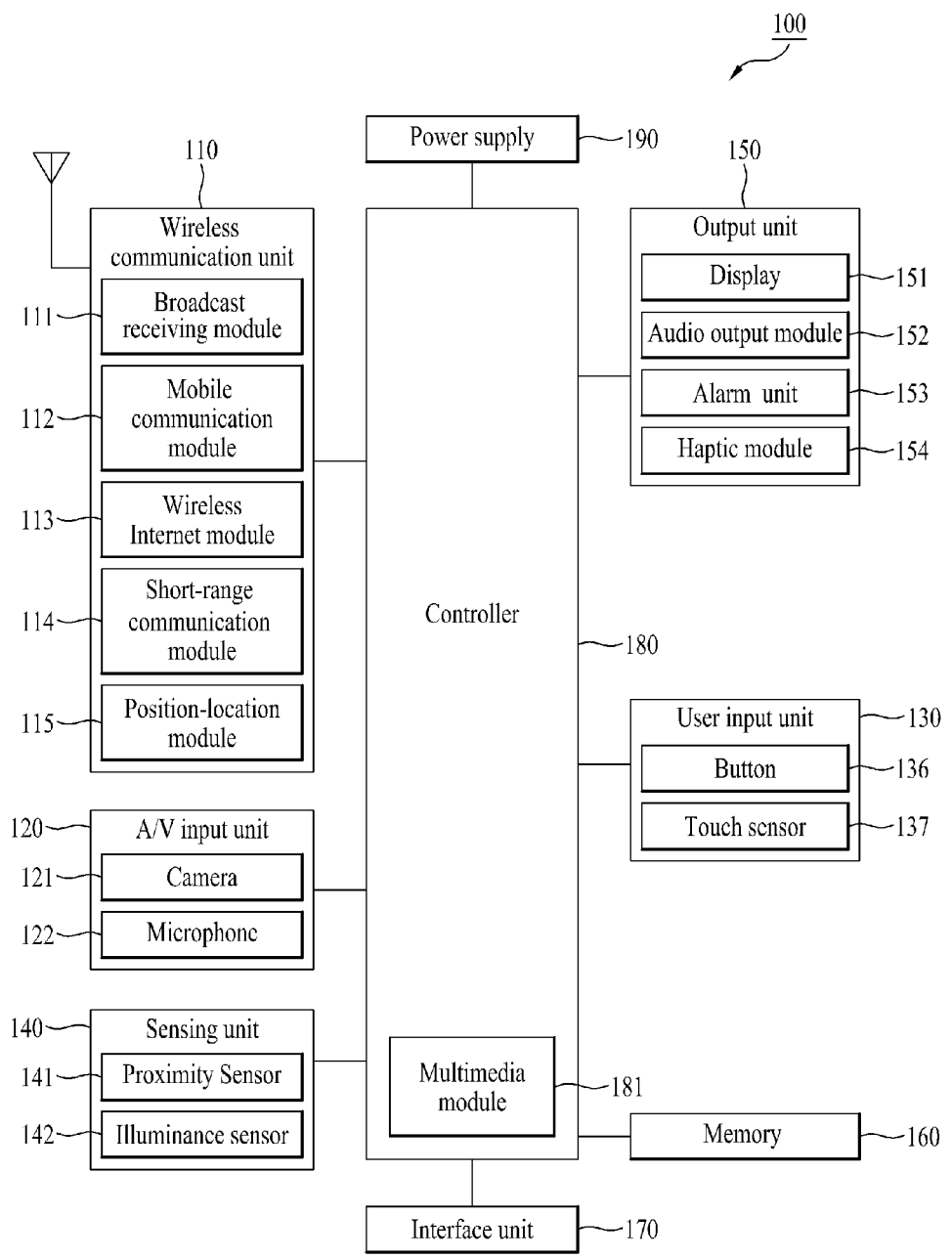
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN(Wireless LAN) (Wi-Fi), WIBRO (Wireless broadband), WIMAX (World Interoperability for Microwave Access), HSDPA (High Speed Downlink Packet Access), GSM, CDMA, WCDMA, LTE (Long Term Evolution) etc.

Wireless internet access by WIBRO, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
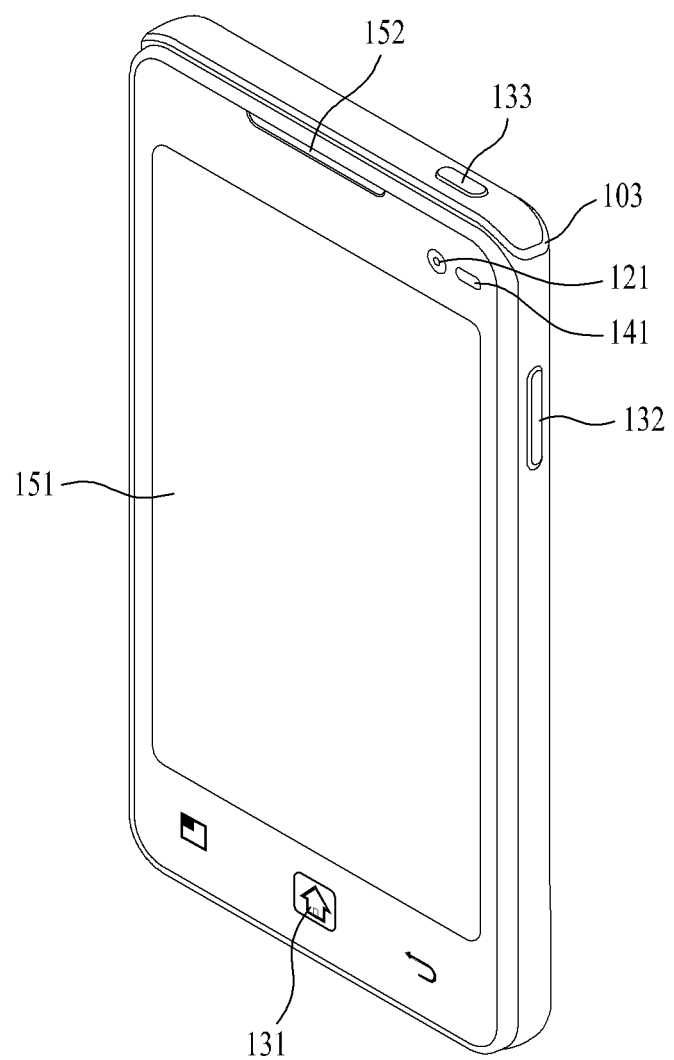
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Figure 3:
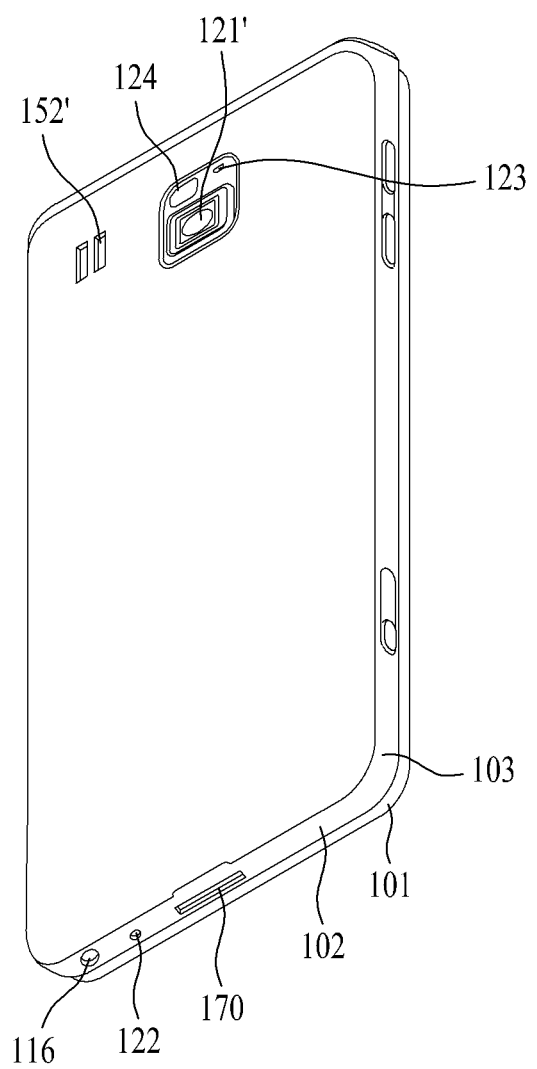
FIG. 3 is a rear perspective diagram of a mobile terminal according to one embodiment of the present invention.

Referring to FIG. 3, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

Referring to FIGS. 2 and 3, the display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, a command such as start, end, scroll and the like is input to the first manipulating unit 131. A command for a volume adjustment of sound output from the audio output unit 152 and the like can be input to the second manipulating unit 132, and a command for a switching to a touch recognizing mode of the display 151 and the like can be input to the second manipulating unit 133.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the front camera 121 shown in FIG. 2 and may have different structure including a sensor having a different pixel count from that of the front camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For the convenience of description, it is assumed that the mobile terminal 100 according to the embodiment of the present invention includes at least one of the components shown in FIG. 1. Specifically, it is assumed that the mobile terminal 100 according to the embodiment of the present invention includes the display 151, the memory 160, and the controller 180 among the components shown in FIG. 1. According to circumstances, it may be assumed that the mobile terminal 100 according to the embodiment of the present invention further includes the wireless communication unit 110.

The mobile terminal 100 according to the embodiment of the present invention may be easily embodied in a case in which the display 151 is a touchscreen. Hereinafter, therefore, it is assumed that the display 151 is a touchscreen. In a case in which the display 151 is a touchscreen, the display 151 may function as an output device to display information and, in addition, as an input device to receive user input. In a case in which the display 151 is not a touchscreen, the mobile terminal 100 according to the embodiment of the present invention may include an additional input unit (e.g. a physical button) to receive user input. In a case in which the display 151 is a touchscreen, however, the mobile terminal 100 may include an additional input unit.

According to the present invention, a method of creating a thumbnail of video may be disclosed. A thumbnail is a reduced-size edition of video, an image, etc. The thumbnail serves as an index indicator enabling videos or images to be easily recognized during a search for videos or images. When a list of videos or images is displayed, the controller 180 may control a thumbnail to be displayed together with a file name of each video or image such that a user can easily recognize the video or image.

A thumbnail of a video may be created by extracting a frame of the video at random time (or predetermined time) from the frames of the video and reducing the size of the extracted frame. Since video includes a plurality of successive frames, there is a problem in recognizing the whole content of the video only using a single extracted frame. Therefore, the present invention proposes a method of creating a thumbnail enabling the entire contents of a video to be easily recognized.

The thumbnail creating method will be described in detail based on the following embodiments which will be described with reference to the accompanying drawings. In the following embodiments, it is assumed that a video may include various types of video, such as video captured using a camera of the mobile terminal, a video received from an external terminal, or a streaming video played via a network connection.

Figure 4:
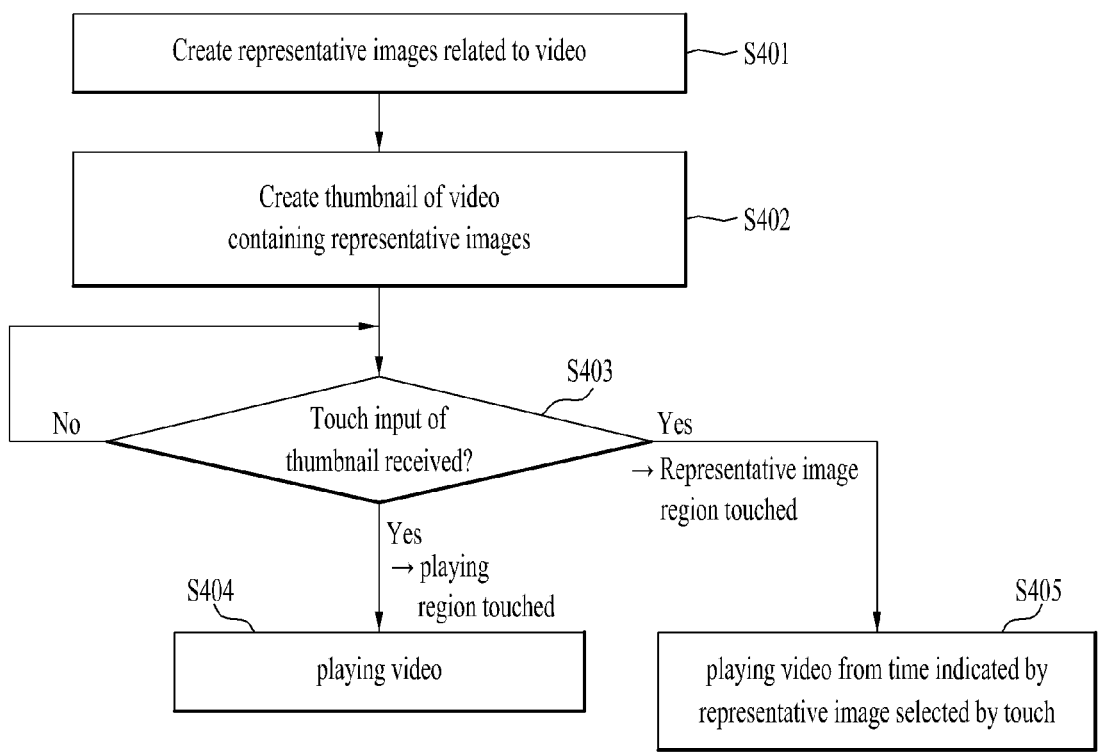
FIG. 4 is a flowchart showing operation of a mobile terminal according to one embodiment of the present invention.

FIG. 4 is a flowchart showing an operation of a mobile terminal 100 according to one embodiment of the present invention. In order to create a thumbnail of a video, the controller 180 may create a plurality of representative images related to the video (S401). The controller 180 may set at least one of the video's plurality of frames as a representative image or create a representative image based on audio content contained in the video. The representative image may comprise multiple sub-representative images arranged within the larger representative image so that each sub-representative image may be easily recognized. For example, the controller 180 may set as a representative image: one or multiple frames corresponding to a specific playing time of the video, a frame contained in a highlight period of the video, a frame corresponding to an appearance time of a specific character in the video, a frame corresponding to the generation of a specific sound in the video, or an image created by displaying text converted from audio during a specific period of the video. Various methods of creating representative images of a video will hereinafter be described in detail with reference to the accompanying drawings.

<Case 1—Dividing a Video Into a Plurality of Periods and Extracting a Representative Image from Each Divided Period>

The mobile terminal 100 according to the embodiment of the present invention may divide a video into a plurality of periods and extract a representative image from each divided period to create a plurality of representative images.

An example in which the whole period of a video is divided into a plurality of periods and a representative image is extracted from each divided period will be described in detail with reference to FIG. 5.

Figure 5:
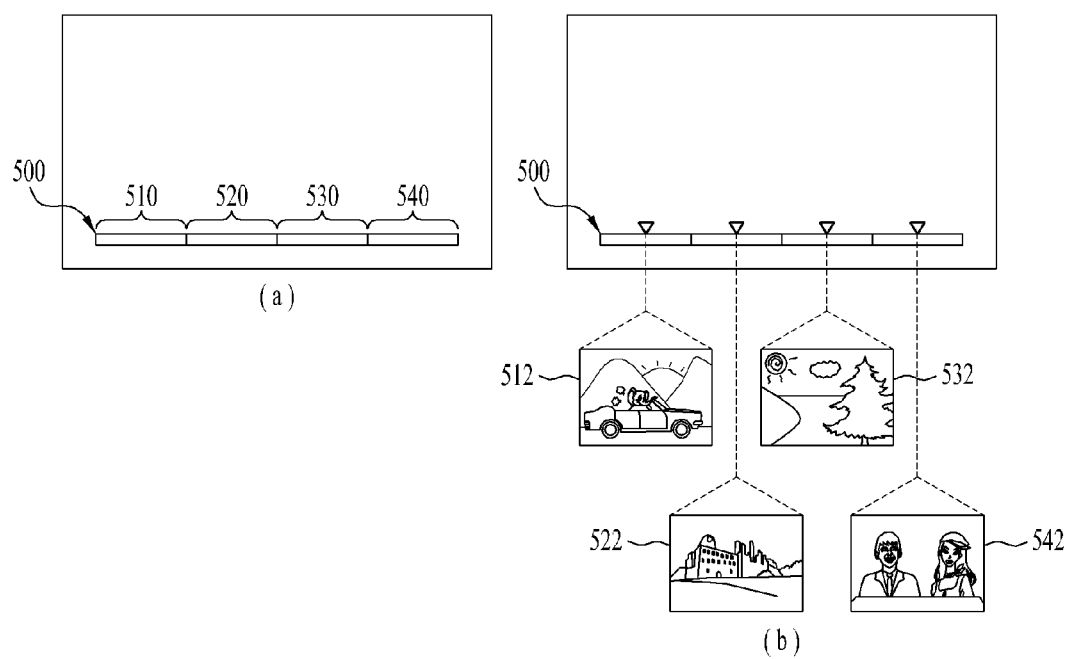
FIG. 5 is a diagram showing an example in which a video is divided into a plurality of periods and a representative image is extracted from each divided period.

FIG. 5 is a diagram showing an example in which the whole period of video is divided into a plurality of periods and a representative image is extracted from each divided period. For the convenience of description, it is assumed that the controller 180 extracts four representative images and that a progress bar 500 shown in FIGS. 5(a) and 5(b) corresponds to the whole period of video.

In order to extract four representative images from video, the controller 180 may divide the whole period of the video into four periods 510, 520, 530, and 540 as shown in FIG. 5(a). Subsequently, the controller 180 may decide frames 512, 522, 532, and 542 to be representative images of the respective divided periods 510, 520, 530, and 540, as shown in FIG. 5(b). FIG. 5(b) illustrates that frames 512, 522, 532, and 542 corresponding to a mid-way point within the respective divided periods 510, 520, 530, and 540. However, the present invention is not limited thereto. The controller 180 may decide frames corresponding to other playing times (e.g. start time or end time of the respective periods) other than the mid-way point in the illustrated example as representative images.

Of course, frames corresponding to different playing times of the respective divided periods may be decided as representative images. For example, the controller 180 may select a frame corresponding to N/4 playing time (or (N−1)/4 playing time, or any other determination based on N), where N represents the ordinal number of the period, as a representative image for each of the four periods 510, 520, 530, and 540 shown in FIG. 5(a). Accordingly, a frame corresponding to ¼ playing time (or start time) of the first period 510 may be decided as a representative image and a frame corresponding to ⅔ playing time (or ¼ playing time) of the second period 520 may be decided as a representative image.

FIG. 5(b) illustrates that one representative image is extracted for each of the divided periods. Of course, however, two or more representative images may be extracted for each of the divided periods.

In general, a video, such as a movie, contains a leading introduction period to display information about the movie, including the actors, directors, producers, or movie distributors, before the movie starts. The video may also contain a trailing conclusion portion to display information such as movie staff and other contributors. Since it is difficult for a user to recognize the content of the movie by viewing a frame of these leading or trailing portions, the controller 180 may extract a representative image from the video after excluding a leading period and a trailing period. To this end, the controller 180 may extract a representative image from the remaining period after excluding a specific predetermined leading period of the video and a specific predetermined trailing period of the video. The details thereof will be described with reference to FIG. 6.

Figure 6:
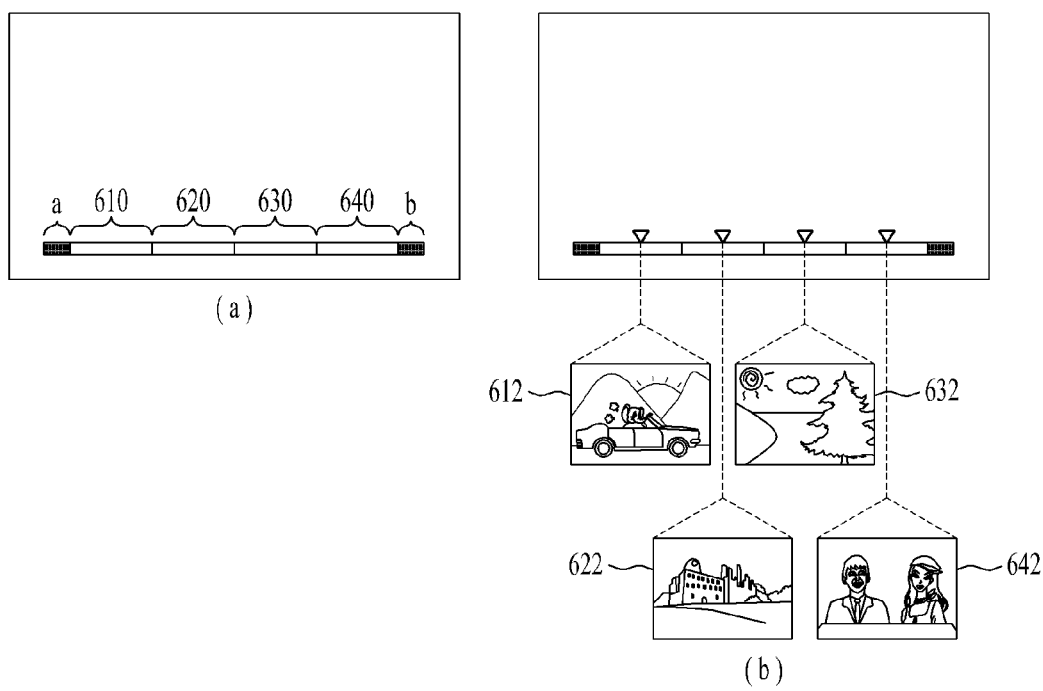
FIG. 6 is a diagram showing an example in which a leading period and a trailing period of a video is excluded, and the remaining period of the video is divided into a plurality of periods and a representative image is extracted from each divided period.

FIG. 6 is a diagram showing an example in which the remaining period of video excluding a specific period is divided into a plurality of periods and a representative image is extracted from each divided period.

As in an example shown in FIG. 6(a), the controller 1880 may divide the remaining period of the video, after excluding a specific predetermined leading period (a) (of FIG. 6(a)) and a specific predetermined trailing period (b) of the video, into four periods 610, 620, 630, and 640. Subsequently, the controller 180 may set at least one frame per divided period, 612, 622, 632, and 642 extracted from the respective divided periods 610, 620, 630, and 640, as representative images as shown in FIG. 6(b).

<Case 2—Setting a Highlight Period of a Video and Extracting a Representative Image from the Highlight Period>

The mobile terminal 100 according to the embodiment of the present invention may set a highlight period in video and extract a representative image from the set highlight period. To this end, the controller 180 may set at least one representative image selected from the most dynamic period in the video, a period containing the loudest sound in the video, and the brightest period in the video as a highlight period.

Speed of a subject recorded in the video may be considered to find the most dynamic period in the video. Specifically, the controller 180 may set the highlight period of the video as a period in which the subject moves the fastest.

Intensity of a sound recorded in the video may be considered to find a period containing the loudest sound in the video. Specifically, the controller 180 may set a period containing the highest intensity of a sound recorded in the video as a highlight period. For example, in a case in which the video is related to a baby, a period of the video in which the baby makes the loudest voice (e.g. a period of the video in which the baby cries) may be set as a highlight period.

Brightness of each frame of the video may be considered to find the brightest period in the video. Specifically, the controller 180 may set a period of the video having the highest brightness as a highlight period. For example, in a case in which the video is related to fireworks, a period of the video in which the fireworks are lit as be set as a highlight period.

When a highlight period is set, the controller 180 may extract a representative image from the set highlight period. The controller 180 may extract one representative image or a plurality of representative images from the highlight period. Of course, a plurality of highlight periods may be set in the video to extract a plurality of representative images.

An example in which a highlight period is set in video and a representative image is extracted from the set highlight period will be described in detail with reference to FIG. 7.

Figure 7:
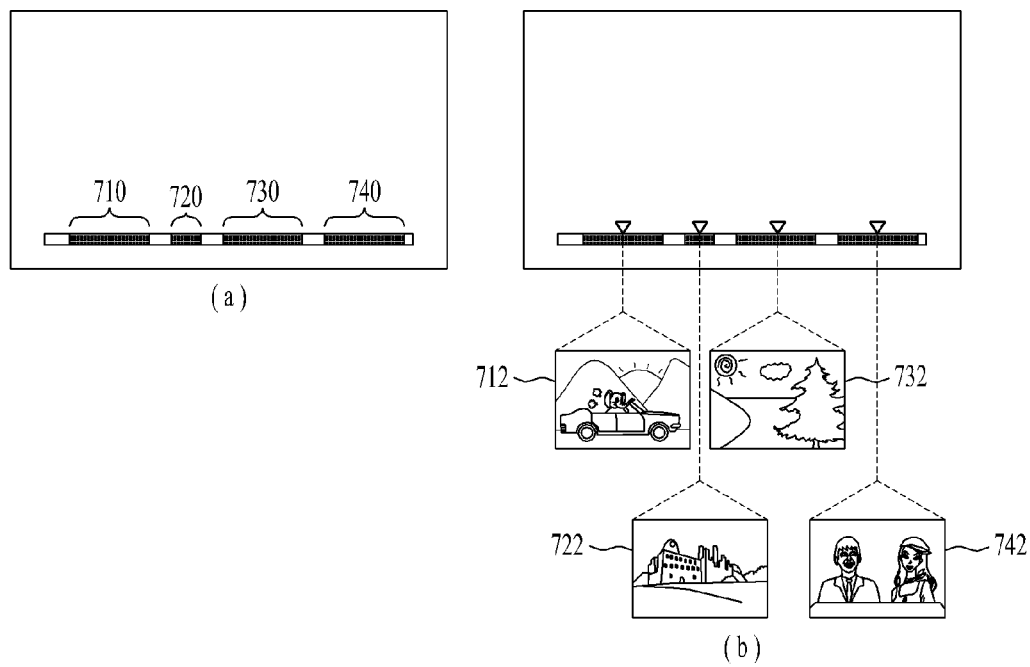
FIG. 7 is a diagram showing an example in which a highlight period is set in a video and a representative image is extracted from the set highlight period.

FIG. 7 is a diagram showing an example in which a highlight period is set in video and a representative image is extracted from the set highlight period.

The controller 180 may set at least one highlight period considering movement speed of a subject recorded in the video, intensity of a sound recorded in the video, and brightness of the video (FIG. 7(a) illustrates an example in which four highlight periods 710, 720, 730, and 740 are set).

The controller 180 may extract representative images 712, 722, 732, and 744 from the set highlight periods 710, 720, 730, and 740. Specifically, the controller 180 may decide frames 712, 722, 732, and 742 corresponding to specific playing time of the respective highlight periods 710, 720, 730, and 740 as representative images. FIG. 7(b) illustrates that frames 712, 722, 732, and 744 corresponding to a mid-point of the respective highlight periods 710, 720, 730, and 740 are decided as representative images. Of course, frames corresponding to playing time (e.g. start time or end time of the respective highlight periods) other than the mid-point in the illustrated example may be decided as representative images.

Of course, frames corresponding to different playing time of the respective highlight periods may be decided as representative images. For example, the controller 180 may control a frame corresponding to N/4 playing time (or (N−1)/4 playing time) of an N-th highlight period to be decided as a representative image for each of the four highlight periods 710, 720, 730, and 740 shown in FIG. 7(a). Accordingly, a frame corresponding to ¼ playing time (or start time) of the first highlight period 710 may be decided as a representative image and a frame corresponding to ²⁄₄ playing time (or ¼ playing time) of the second highlight period 720 may be decided as a representative image.

<Case 3—Creating a Representative Image Per Character>

The mobile terminal 100 according to the embodiment of the present invention may create a representative image for each character that appears in a video. An example in which a representative image per character is created will be described in detail with reference to FIG. 8.

Figure 8:
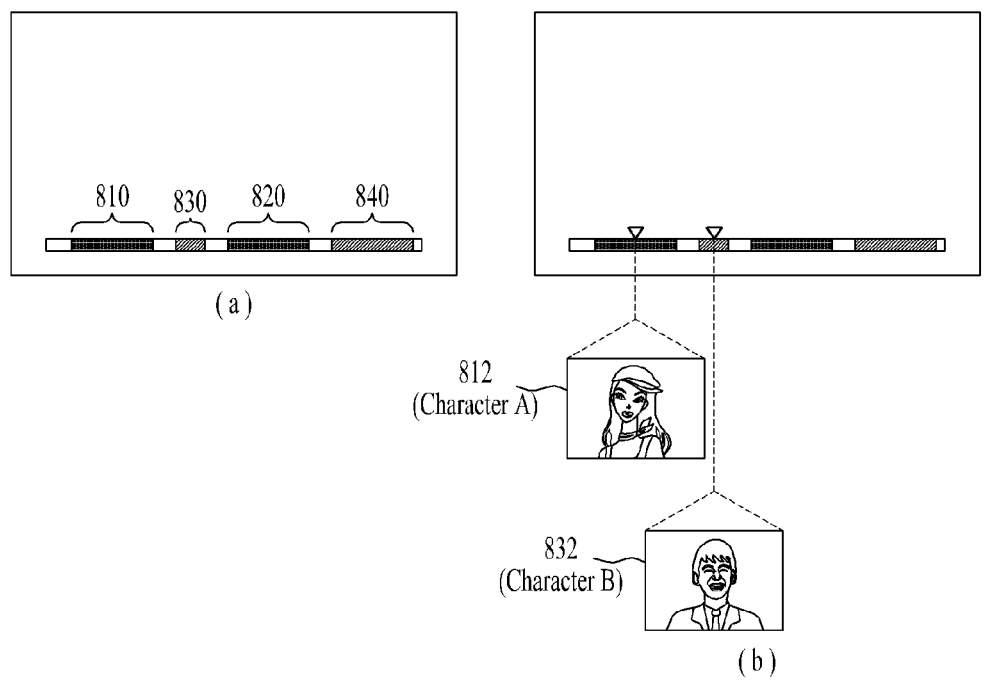
FIG. 8 is a diagram showing an example in which a representative image per character is created.

FIG. 8 is a diagram showing an example in which a representative image per character is created. The controller 180 may set any one of frames containing a specific character as a representative image of the character. For example, in a case in which there exists a total of two periods 810 and 820 containing character A as in an example shown in FIG. 8(a), the controller 180 may extract at least one frame 812 from the two periods 810 and 820 to create a representative image of character A. In the same manner, the controller 180 may extract at least one frame 814 from periods 830 and 840 containing character B to create a representative image of character B.

In extracting at least one frame containing a specific character, the controller 180 may extract a frame best expressing the specific character. Here, the frame best expressing the specific character may be a frame in which the specific character has the largest role, is displayed the largest, or is distinctly or most prominently displayed based on brightness, sharpness, or other appearance characteristics.

In creating a representative image for a character, the controller 180 may first create a representative image of a character having high relative importance in consideration of at least one selected from appearance frequency and appearance time per character. For example, in a case in which the number of representative images to be created is two and the number of characters in video is four, the controller 180 may create representative images of two characters having high relative importance considering the relative importance of the characters.

<Case 4—Creating a Representative Image Based on the Particulars of Event Generation>

The mobile terminal 100 according to the embodiment of the present invention may create a representative image of a video based on previous events related to the mobile terminal Specifically, the controller 180 may select representative images of a video based on the appearance of a person or party who is a participant or subject of a previous event related to the mobile terminal. The number of representative images and the order in which they are selected from the video displaying each person or party may be based on the number of related events involving the person or party and the order in which the events took place.

Here, an event related to the mobile terminal may include a telephone communication, the transmission or reception of a message (a text message or an instant message), a conversation using a social network service (SNS), or an event scheduled on a calendar, appointment log, or to-do list. Meanwhile, the person or party involved with an event may include telephone communication participant, a counterpart person or party for the transmission or reception of a message, a counterpart person or party for a conversation using an SNS, or a person who holds a scheduled appointment, or an invitee or inviter of a scheduled event.

An example in which a representative image of another person or party involved in an event related to the mobile terminal is created will be described in detail with reference to FIG. 9.

Figure 9:
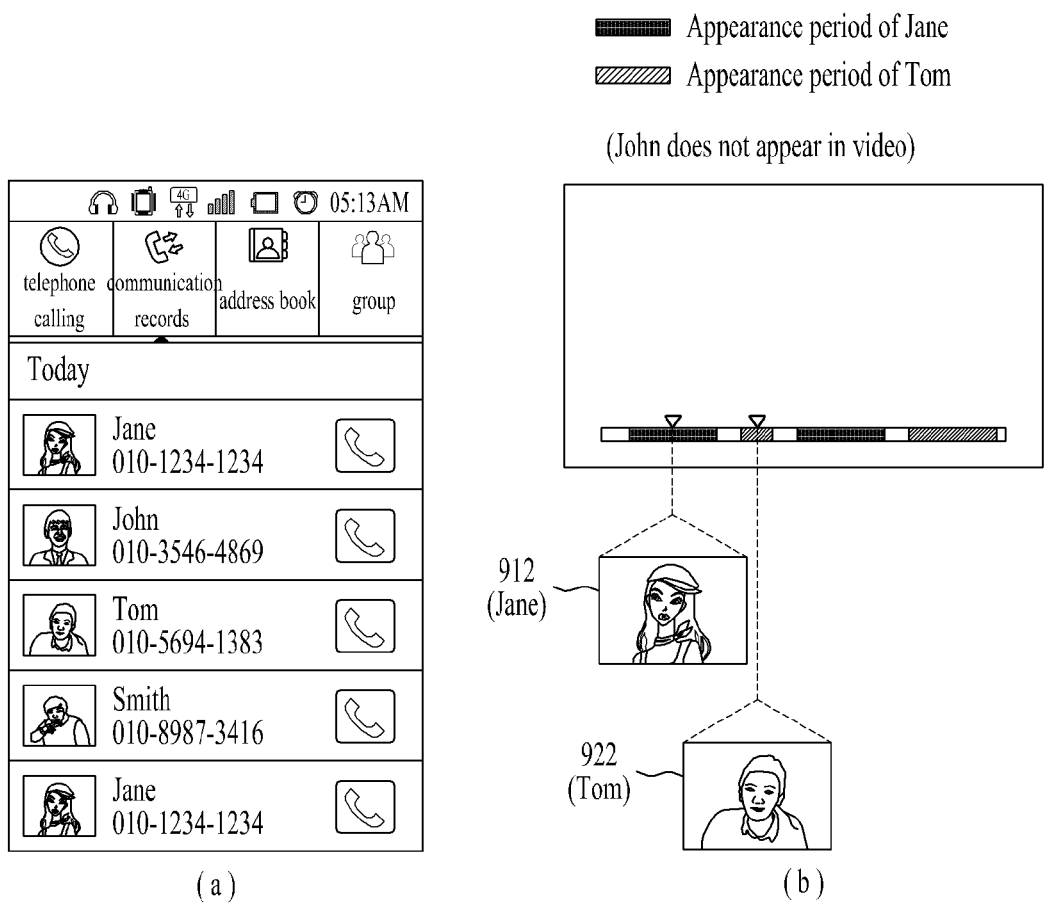
FIG. 9 is a diagram showing an example in which a representative image is extracted from a video which includes an image of another person or party who was involved with a recent event generated at the mobile terminal.

FIG. 9 is a diagram showing an example in which a representative image of another person or party is selected from a video. For the convenience of description, it is assumed in FIG. 9 that the event is telephone communication and that representative images are created in the order in which the latest events have been generated at the mobile terminal.

FIG. 9(a) is a diagram showing the communication details of the mobile terminal 100 and FIG. 9(b) is a diagram showing an example in which a representative image is created based on the communication details of the mobile terminal 100. The controller 180 may extract a predetermined number of frames containing the other party involved in the telephone communication from the video in the order in which the latest event has been generated based on the communication details of the mobile terminal 100. In a case in which there is no frame containing the other party involved in the most recent telephone communication at the mobile terminal, the controller 180 may extract a frame containing the other party involved in the telephone communication which took place second-most recently, and so on.

In an example shown in FIGS. 9(a) and 9(b), a frame 912 containing Jane and a frame 922 containing Tom are decided as representative images in order of the user's latest communication.

<Case 5—Creating a Representative Image Using STT>

The mobile terminal 100 according to the embodiment of the present invention may convert voice audio in a specific period of the video into text (speech to text (STT)) and create a representative image based on the text. The details thereof will be described with reference to FIG. 10.

Figure 10:
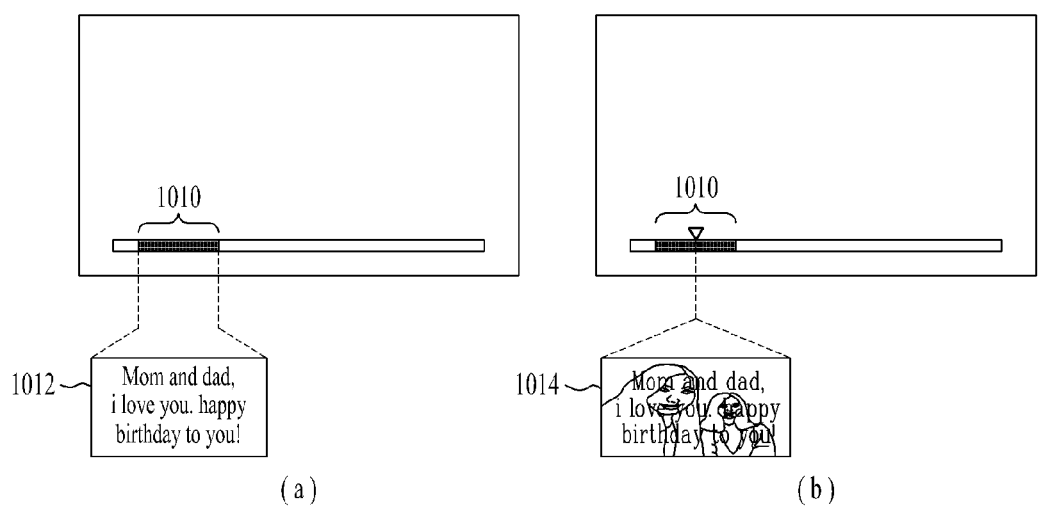
FIG. 10 is a diagram showing an example in which a representative image is created based on text converted from audio corresponding to a specific period of the video.

FIG. 10 is a diagram showing an example in which a representative image is created based on text corresponding to voice audio played in a specific period of a video. The controller 180 may convert voice audio in a specific period 1010 into text (STT) and create a representative image based on the converted text as in an example shown in FIG. 10(a) or 10(b).

Specifically, the controller 180 may create a representative image 1012 in which the converted text is displayed on a monochromatic background as in an example shown in FIG. 10(a) or a representative image 1014 in which the converted text is displayed on a frame corresponding to specific point within a period 1010 from which the voice audio has been extracted as a background, as shown in FIG. 10(b).

The controller 180 may randomly decide a period of the video from which the voice audio clip is to be extracted or may use a predetermined number of periods selected from the video in which the loudest voice audio clips are reproduced.

<Case 6—Creating a Representative Image Using a Photograph Related to Video>

The mobile terminal 100 according to the embodiment of the present invention may extract a plurality of representative images from a video based on a photograph related to the video. The photograph related to the video may be manually selected by a user or it may be automatically selected according to a predetermined criterion. Specifically, the controller 180 may automatically select a photograph related to the video based on at least a time the photograph was taken, a location where the photograph was taken, or a person or character appearing in the photograph. For example, the controller 180 may select a photograph taken before or after the video recording date (or a photograph taken at the same date as the video), a photograph taken at the same location as the video, or a photograph containing the same person or character as in the video.

In another example, the controller may select as a related photograph a photograph which appears adjacent to video when a multimedia file list is displayed.

When a photograph related to the video is selected, the controller 180 may extract a plurality of representative images from the video based on information of the photograph related to the video. For example, the controller 180 may extract a period analogous to the photograph, such as a period containing the same character as in the photograph, a period containing the same object as in the photograph, or a period containing the same background as in the photograph, and extract at least one frame from the extracted period as a representative image.

Figure 11A:
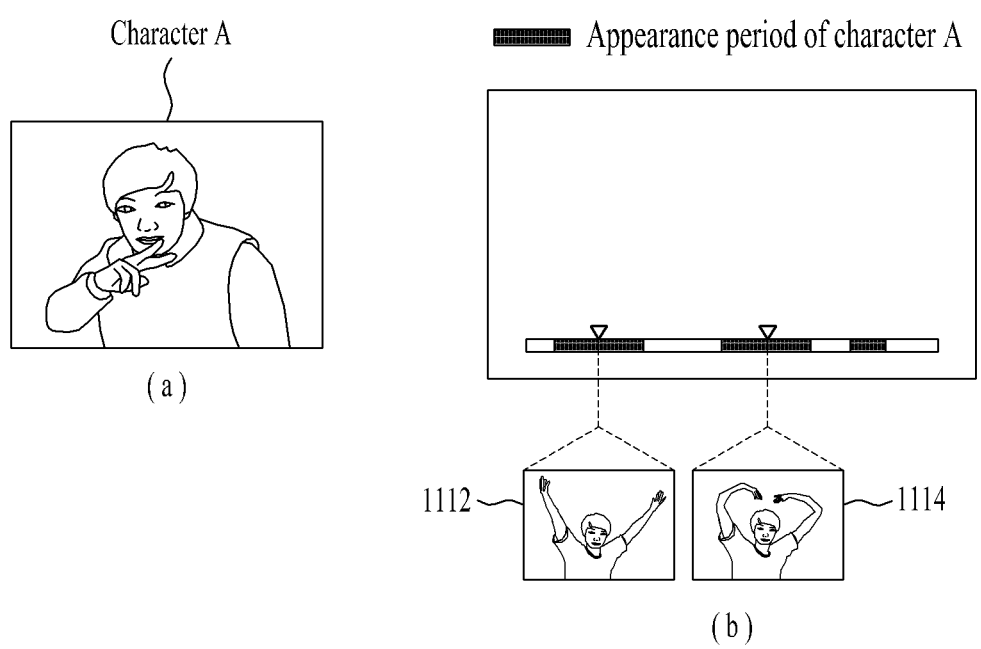
FIGS. 11A and 11B are diagrams showing an example in which a representative image is extracted from a video based on a photograph related to the representative image.
Figure 11B:
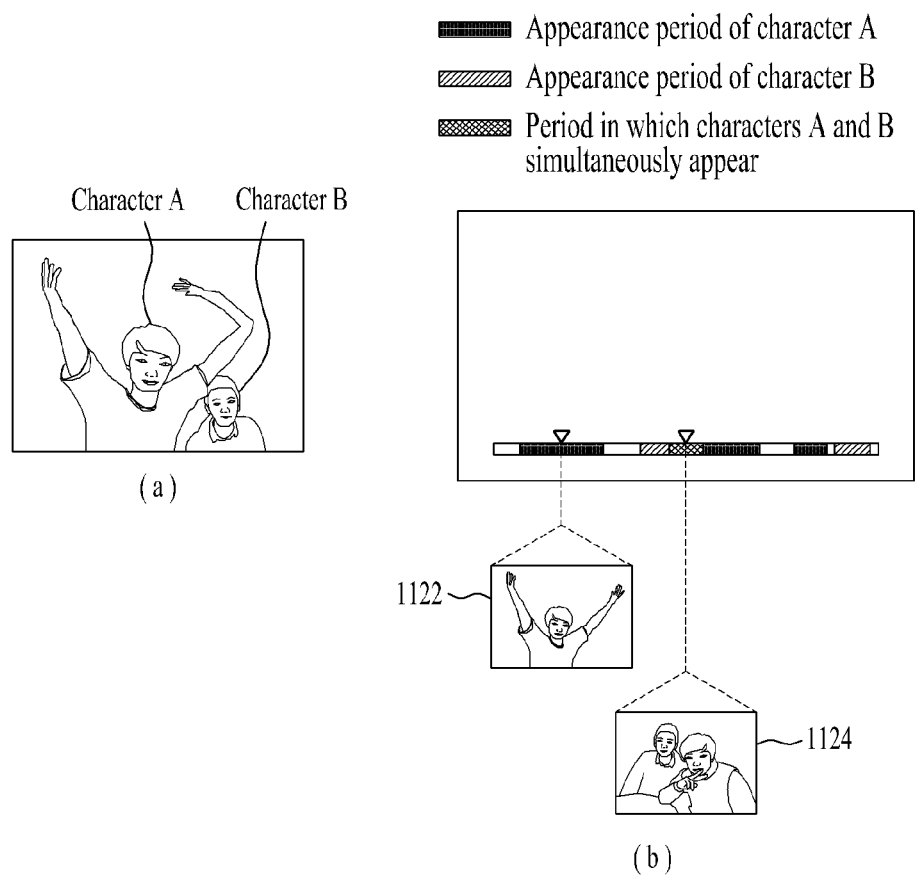

For example, FIGS. 11A and 11B are diagrams showing an example in which a representative image is extracted from a video based on a related photograph. FIGS. 11A(a) and 11B(a) are diagrams showing photographs related to the video and FIGS. 11A(b) and 11B(b) are diagrams showing representative images extracted from the video.

In a case in which a photograph contains a character as shown in FIG. 11A(a), the controller 180 may extract from the video a period containing the same character as in the photograph. When the period containing the same character as in the photograph is extracted, the controller 180 may create at least one representative image 1112 and 1114 from the extracted period as in an example shown in FIG. 11A(b).

In a case in which a photograph contains a plurality of characters as in an example shown in FIG. 11B(a), the controller 180 may extract at least one selected from a period in which the characters have been simultaneously recorded and a period in which the characters have been individually recorded from the video. Specifically, in a case in which a plurality of characters in the photograph is referred to as a first character and a second character in an example shown in FIG. 11B(a), the controller 180 may control a period containing both the first character and the second character, a period containing the first character, and a period containing the second character to be selected and at least one representative image 1122 and 1124 to be created from each period as shown in FIG. 11B(b). Then, the controller 180 may create a representative image from the period containing both the first character and the second character.

Although not shown, a plurality of photographs may be decided as photographs related to the video. In this case, the controller 180 may extract a period related to each photograph from the video and create at least one representative image from each extracted period.

Here, a photograph related to the video may be at least one selected from among a photograph taken before or after a video recording (or a photograph taken at the same date as in the video), a photograph taken at the same place as the video, or a photograph containing the same character as in the video.

In addition, a photograph related to the video may be a photograph located adjacent to video when a multimedia file list is displayed.

Figure 12:
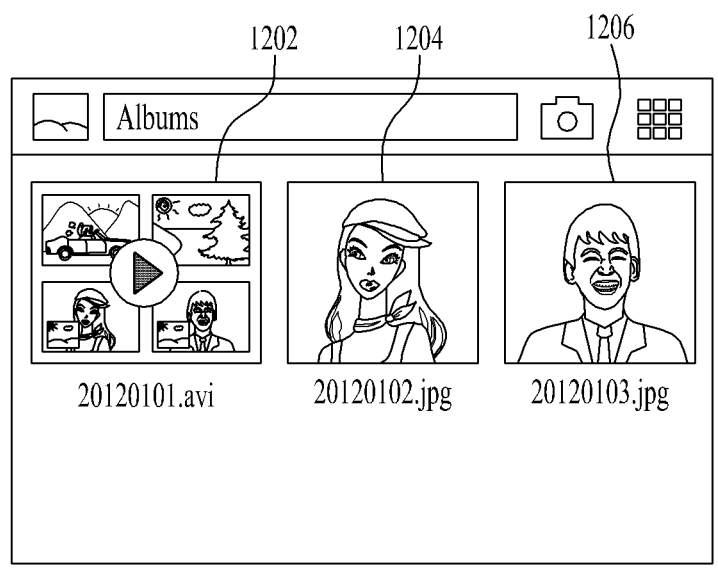
FIG. 12 is a diagram illustrating an example of a multimedia file list in which a photograph located adjacent to a video is selected as a photograph related to the video.

For example, FIG. 12 is a diagram illustrating an example in which a photograph located adjacent to video when a multimedia file list is displayed is selected as a photograph related to the video.

As in an example shown in FIG. 12, the controller may select as a related photograph a photograph 1204 located next (or previous) to video 1202 when a multimedia file list is displayed. In FIG. 12, photograph '20120102.jpg' 1204 located next to the video 1202 may be decided as a photograph related to the video. In another example, a plurality of photographs located next (or previous) to the video may be set as photographs related to the video or all photographs displayed on the same screen as the video may be set as photographs related to the video. In this case, both photograph '20120102.jpg' 1204 and photograph '20120103.jpg' 1206 displayed on the same screen as the video 1202 may be set as photographs related to the video.

<Case 7—Creating a Representative Image Using a Keyword>

The mobile terminal 100 according to the embodiment of the present invention may extract a plurality of representative images from a video based on a keyword. Specifically, when a user inputs a keyword, the controller 180 may extract a period containing a character indicated by the input keyword, a period containing an object indicated by the input keyword, or a period containing voice audio matched with the input keyword and extract at least one frame from the extracted period as a representative image.

Figure 13:
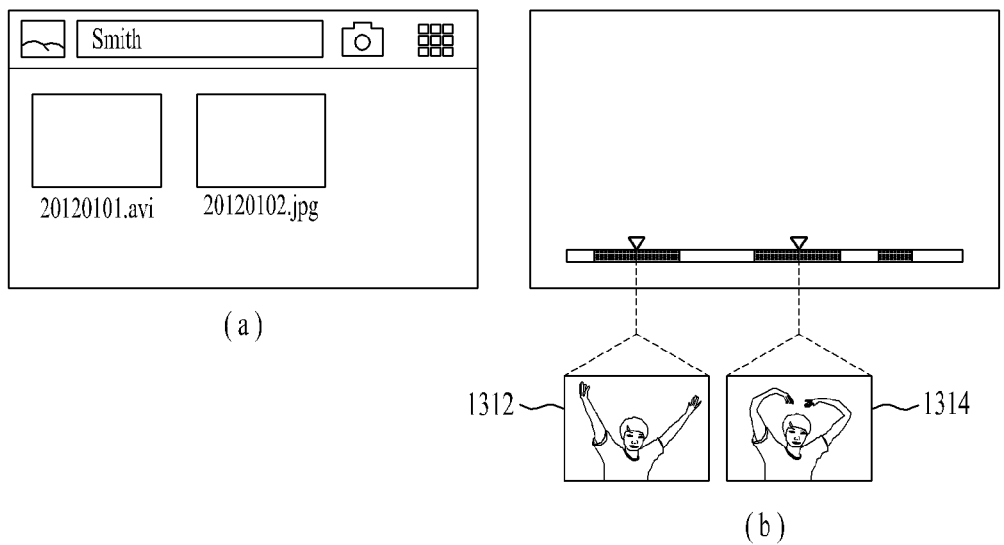
FIG. 13 is a diagram showing an example in which a representative image is extracted from a video based on a keyword.

FIG. 13 is a diagram showing an example in which a representative image is extracted based on a keyword. FIG. 13(a) is a diagram illustrating a keyword input by a user and FIG. 13(a) is a diagram showing an example in which a representative image is extracted from a period of the video related to the input keyword. When the user inputs the name of a specific character as a keyword as in the example shown in FIG. 13(a), the controller 180 may extract a period of the video containing the character indicated by the input keyword and at least one representative image 1312 and 1314 to be created from the extracted period as in the example shown in FIG. 13(b).

Although not shown, in a case in which a period containing a voice audio clip matched with the input keyword is extracted, a representative image may be created based on the text converted from the voice audio in the extracted period (STT) as previously described in connection with Case 5.

The controller 180 may extract a representative image using a keyword previously input by the user as a web search. Alternatively, the controller 180 may create a representative image based on a keyword input in a search window while a multimedia file list is displayed as in the example shown in FIG. 13(a).

The mobile terminal 100 according to the embodiment of the present invention may create a plurality of representative images using the above-described representative image creating methods together. For example, some of the representative images may be created using one of the methods according to Case 1 to Case 7 and the other representative images may be created using another of the methods according to Case 1 to Case 7. In another example, the controller 180 may create one representative image according to a conventional method (i.e. extract one corresponding to random or predetermined time of all the frames of the video) and the other representative images may be created using at least one of the other methods according to Case 1 to Case 7.

Meanwhile, the embodiments are not limited to constant use of only one the representative image creating methods. The controller 180 may randomly decide a thumbnail creating criterion whenever it is required to create a thumbnail. For example, the controller 180 may create a representative image using one of the methods according to Case 1 to Case 7 when it is required to create a first thumbnail and create a representative image using another of the methods according to Case 1 to Case 7 when it is required to create the next thumbnail. It may be required to create a new thumbnail when a multimedia file list is to be displayed, when a new file is added to the multimedia file list, and when a sorting criterion of the multimedia file list is changed.

Even when representative images is created using the same method, the controller 180 may randomly decide frame extraction times when it is necessary to create a thumbnail. For example, in a case in which a representative image is to be created using the method according to Case 1, the controller 180 may decide a frame corresponding to a mid-point of each period as a representative image for a first thumbnail, and decide a frame corresponding to a ¾ point of each period when it is required to create the next thumbnail.

Referring back to FIG. 4, after the representative images are created, the controller 180 may create a thumbnail containing the representative images (S402). Specifically, the controller 180 may create a thumbnail containing the representative images by arranging the representative images in a predetermined order. A thumbnail containing a plurality of representative images will be described in detail with reference to FIG. 14.

FIG. 14 is a diagram illustrating a thumbnail containing a plurality of representative images. The controller 180 may set a plurality of representative images 1412, 1414, 1416, and 1418 such that the representative images 1412, 1414, 1416, and 1418 have the same size, and may arrange the representative images 1412, 1414, 1416, and 1418 in a tile pattern to create a thumbnail as in an example shown in FIG. 14(*a*), or may set a plurality of representative images 1422, 1424, 1426, and 1428 such that the representative images 1422 and 1428 are shown in a smaller size than the representative images 1424 and 1424, and arrange the representative images 1422, 1424, 1426, and 1428 in a tile pattern to create a thumbnail as in an example shown in FIG. 14(*b*). In another example, the controller 180 may arrange a plurality of representative images 1432, 1434, 1436, and 1438 as if the representative images 1432, 1434, 1436, and 1438 are thrown on the floor or table to create a thumbnail as in an example shown in FIG. 14(*c*). In a further example, the controller 180 may control any one of a plurality of representative images 1442, 1444, 1446, and 1448 to be set as a background image 1448 and the other representative images 1442, 1444, and 1446 to be displayed on the background image 1448 in an overlay fashion as in an example shown in FIG. 14(*d*). Although not shown, the representative images 1442, 1444, and 1446 displayed on the background image 1448 in the overlay fashion may be set to be semitransparent.

The controller 180 may decide an arrangement sequence of representative images based on a time order of the representative images or a degree of importance of the representative images.

In a case in which a representative image per character in a video is created, the controller 180 may use a degree of importance of the characters appearing in the representative images to determine an arrangement sequence. Specifically, the controller 180 may determine that a representative image of a character having higher relative importance in appearance has a higher degree of importance. Here, the relative importance in appearance of the characters may be decided based on appearance frequency or appearance time per character.

In a case in which representative images are created which display other persons or parties involved with previous events related to the mobile terminal, the controller 180 may determine a degree of importance of the representative images based on an order in which the events occurred and the number of times each event occurred. Specifically, the controller 180 may determine that a representative image of the other person or party related to the most recent event or the other person or party having of the highest frequency of involvement in previous events has a higher degree of importance.

In a case in which a plurality of highlight periods are set and a representative image is created from each highlight period, the controller 180 may decide a degree of importance of the representative images based on dynamic movement of the displayed subjects or characters, loudness or volume of the corresponding audio, or the brightness of each highlight period.

The controller 180 may control information related to the representative images contained in the thumbnail and displayed on the respective representative images. Here, information related to a representative image may include information regarding the playing time corresponding to the representative image or information regarding a character related to the representative image. For example, the controller 180 may control information regarding the playing time corresponding to each representative image to be displayed as in the example shown in FIG. 14(*a*) or may control information regarding a character related to each representative image to be displayed (in FIG. 14(*b*), the name of the character is displayed) as in the example shown in FIG. 14(*b*).

The representative image arrangement methods of FIG. 14 are illustrated for the convenience of description and, therefore, the present invention is not limited thereto. Of course, the representative images may be arranged to create a thumbnail using various methods in addition to the example shown in FIG. 14. Although FIG. 14 illustrates that a thumbnail is created based on four representative images, the thumbnail may be created based on a less number or a more number of representative images.

When the thumbnail is created, the controller 180 may assign a portion of the thumbnail as a video playing region and the other portion of the thumbnail as a representative image region. For example, FIG. 15 is a diagram illustrating a video playing region and a representative image region of a thumbnail.

Figure 15:
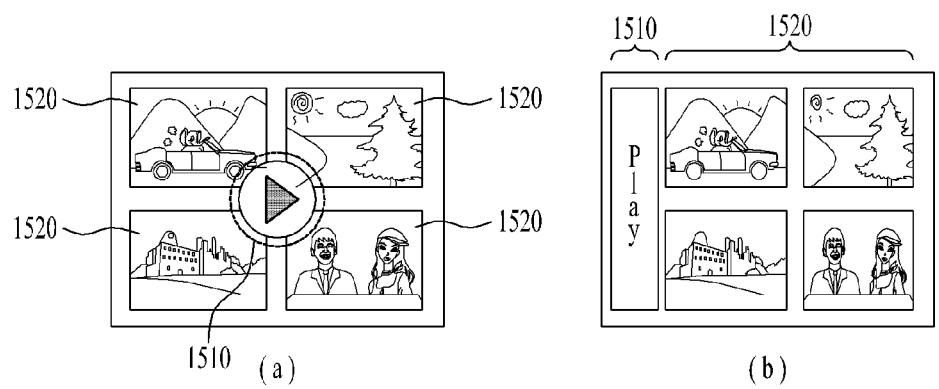
FIG. 15 is a diagram illustrating a video playing region and a representative image region of a thumbnail.

As in an example shown in FIGS. 15(*a*) and 15(*b*), the controller 180 may assign a portion of the thumbnail as a video play command region 1510 and the other portion of the thumbnail as a representative image region 1520. FIG. 15(*a*) illustrates that the video playing region 1510 is set to be located at the middle of the thumbnail and FIG. 15(*b*) illustrates that the video play command region 1510 is set to be located at one end of the thumbnail.

As in the example shown in FIGS. 15(*a*) and 15(*b*), the controller 180 may control information (e.g. a triangular playing indicator or text to indicate a play command region) to visually distinguish the video play command region 1510 to be displayed.

When the video play command region of the thumbnail is touched (S403), the controller 180 may play the video (S404). Specifically, when the video play command region is touched or receives an input, the controller 180 may play the video from the beginning or start to play the video from a point where the previous playing of the video was stopped.

When the representative image region of the thumbnail is touched (S403), on the other hand, the controller 180 may start to play the video from time indicated by the representative image selected by the touch or play the video only during the period represented by the representative image selected by the touch (S405). The details thereof will be described in detail with the accompanying drawings.

Figure 16:
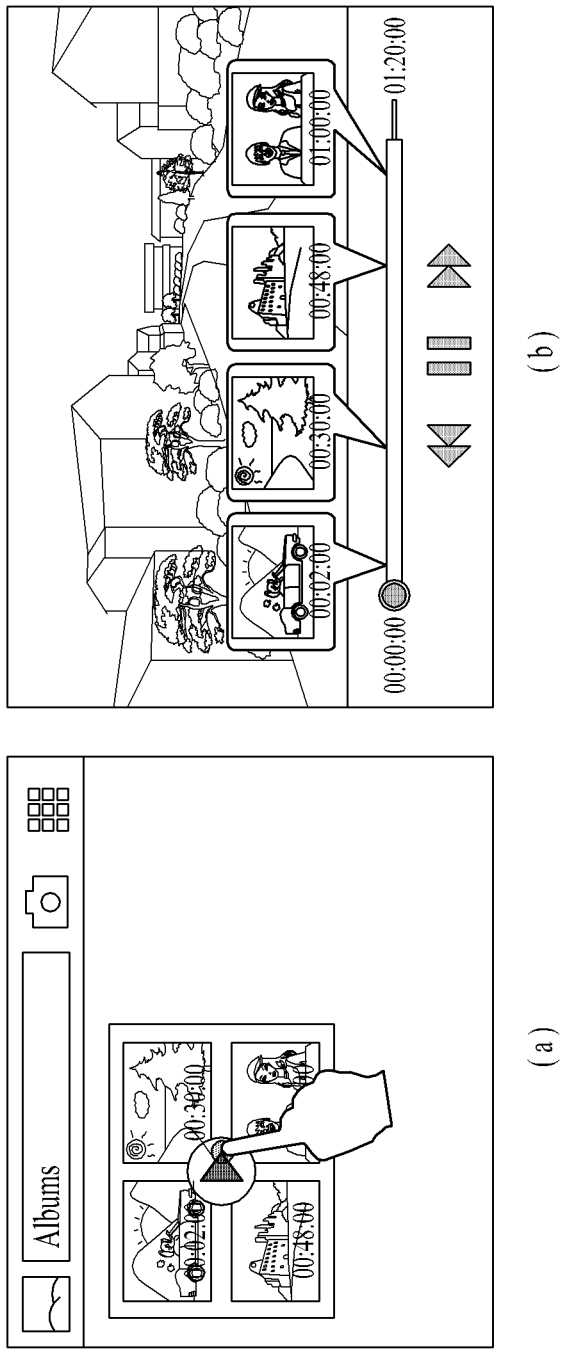
FIG. 16 is a diagram illustrating operation of a mobile terminal when a video playing region is touched.
Figure 17:
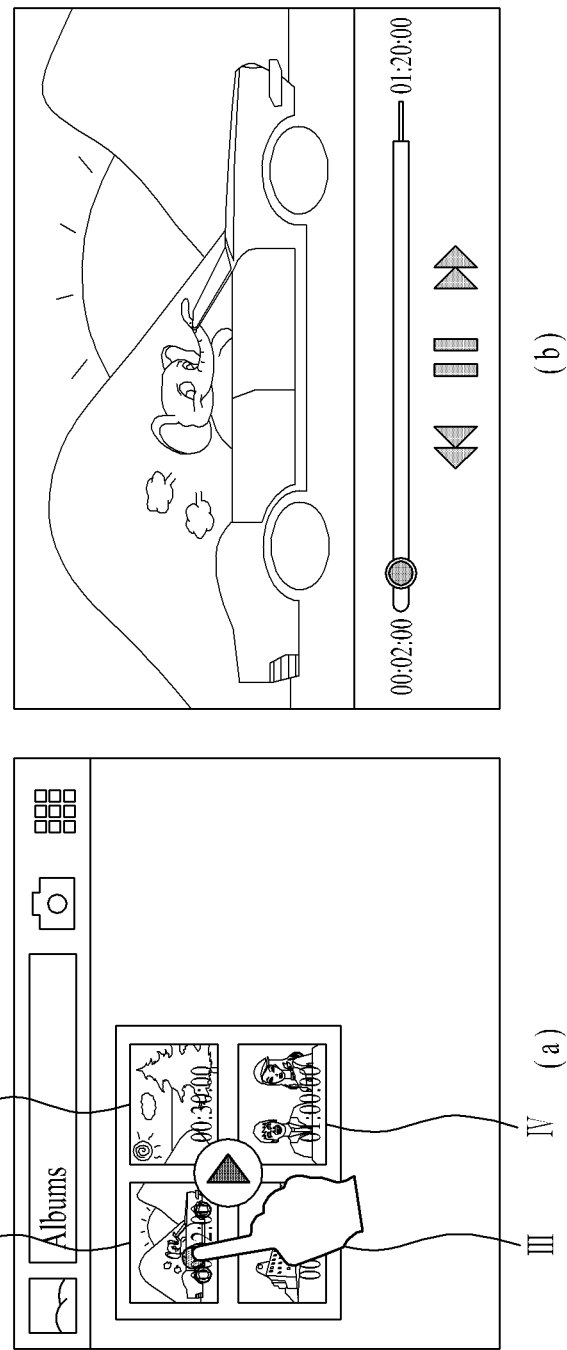
FIGS. 17, 18, 19A, and 19B are diagrams illustrating operation of a mobile terminal when a representative image region is touched.

FIG. 16 is a diagram illustrating operation of the mobile terminal 100 when the video play command region is touched. When the video play command region is touched as in an example shown in FIGS. 16(a) and 16(b), the controller 180 may play the video. At this time, the controller 180 may play the video from the beginning as in the example shown in FIG. 16(b) or start to play the video from a point where the previous playing of the video was stopped (not depicted).

When the video is played, the controller 180 may control each representative image constituting the thumbnail of the video and the position of each representative image to be displayed on a progress bar indicating a playing time of the video as in the example shown in FIG. 16(b). When any one of the representative images constituting the thumbnail on the progressing bar is touched, the controller 180 may control the current playing time to be changed to playing time corresponding to the selected representative image.

FIGS. 17, 18, 19A, and 19B are diagrams illustrating operation of a mobile terminal 100 when a representative image region is touched. For the convenience of description, representative images contained in a thumbnail will be referred to as first to fourth representative images I to IV in a clockwise direction.

When the representative image region is touched, the controller 180 may control the video to be played from a point corresponding to the representative image selected by the touch. For example, when the first representative image I is touched as in an example shown in FIG. 17(a), the controller 180 may control the video to be played from the playing time (00:02:00 in FIGS. 17(a) and 17(b)) corresponding to the first representative image I as in an example shown in FIG. 17(b). Although not shown, even in a case in which the representative image region is touched to play the video, each representative image constituting the thumbnail of the video and the position of each representative image may be displayed on the progress bar indicating playing time of the video as in the example shown in FIG. 16(b).

Figure 18:
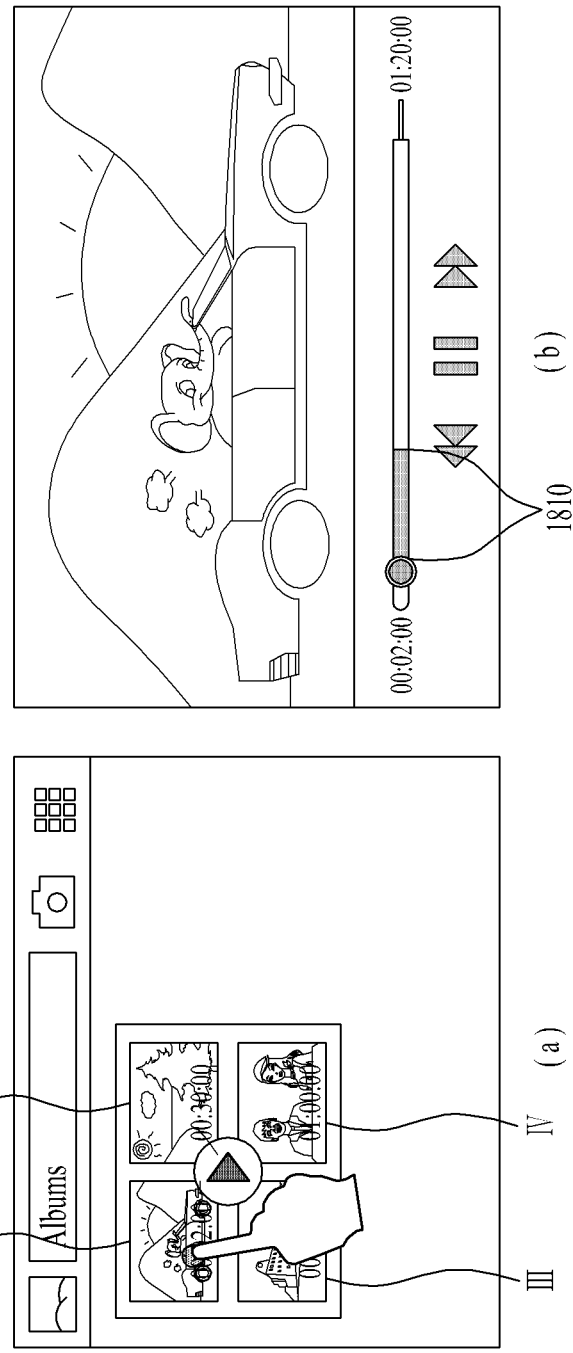

In another example, the controller 180 may control the video to be played only during the period represented by the representative image selected by the touch. For example, when the first representative image I is touched as shown in FIG. 18, the controller 180 may control the video to be played only during the period represented by the first representative image I. Here, a period represented by a representative image may be any one period when the whole video is divided into a plurality of periods (see Case 1), a highlight period (see Case 2), a period containing a specific character (see Case 3, Case 4, Case 6, and Case 7), or a period containing voice audio corresponding to specific text or keyword (see Case 5 and Case 7).

In a case in which a representative image represents a plurality of periods, the controller 180 may control the video to be played only during the plurality of periods indicated. For example, in a case in which the first representative image I is for a specific character and the specific character corresponding to the first representative image I appears in a plurality of periods as in the example shown in FIG. 19(a), the controller 180 may play the video only during the plurality of periods as in the example shown in FIG. 19(b). Consequently, it is possible for a user to easily and conveniently view only the periods in which the specific character appears from the entire video.

Figure 19A:
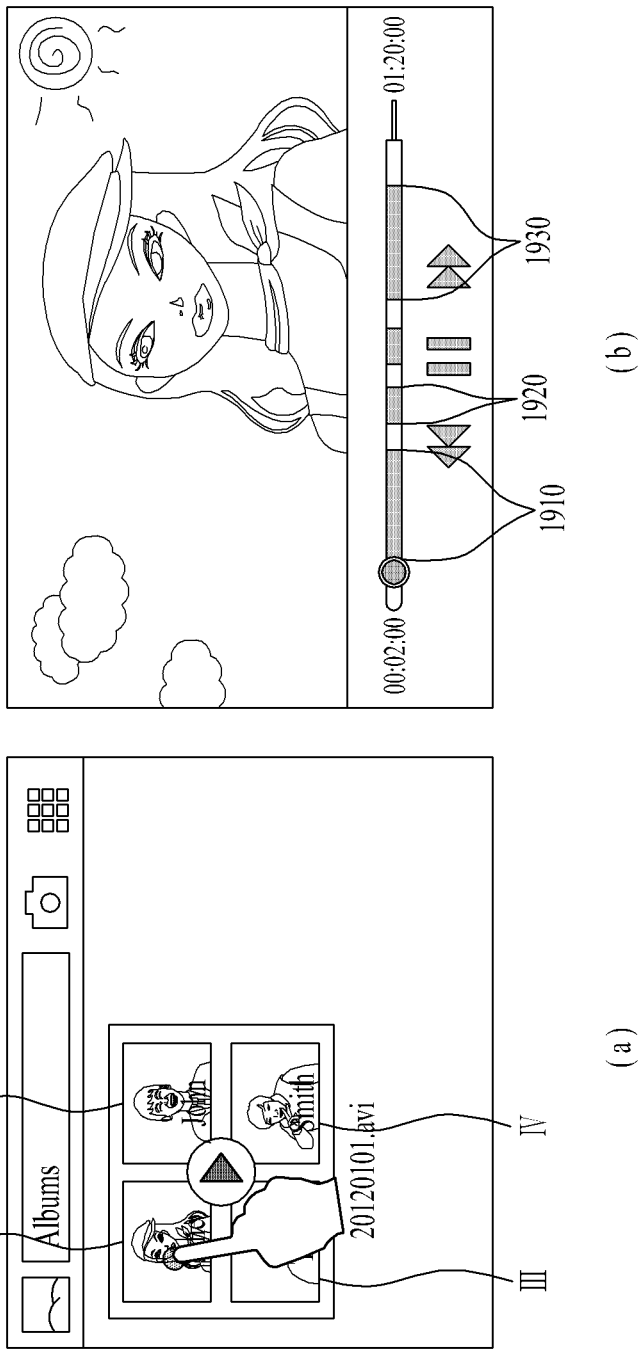
Figure 19B:
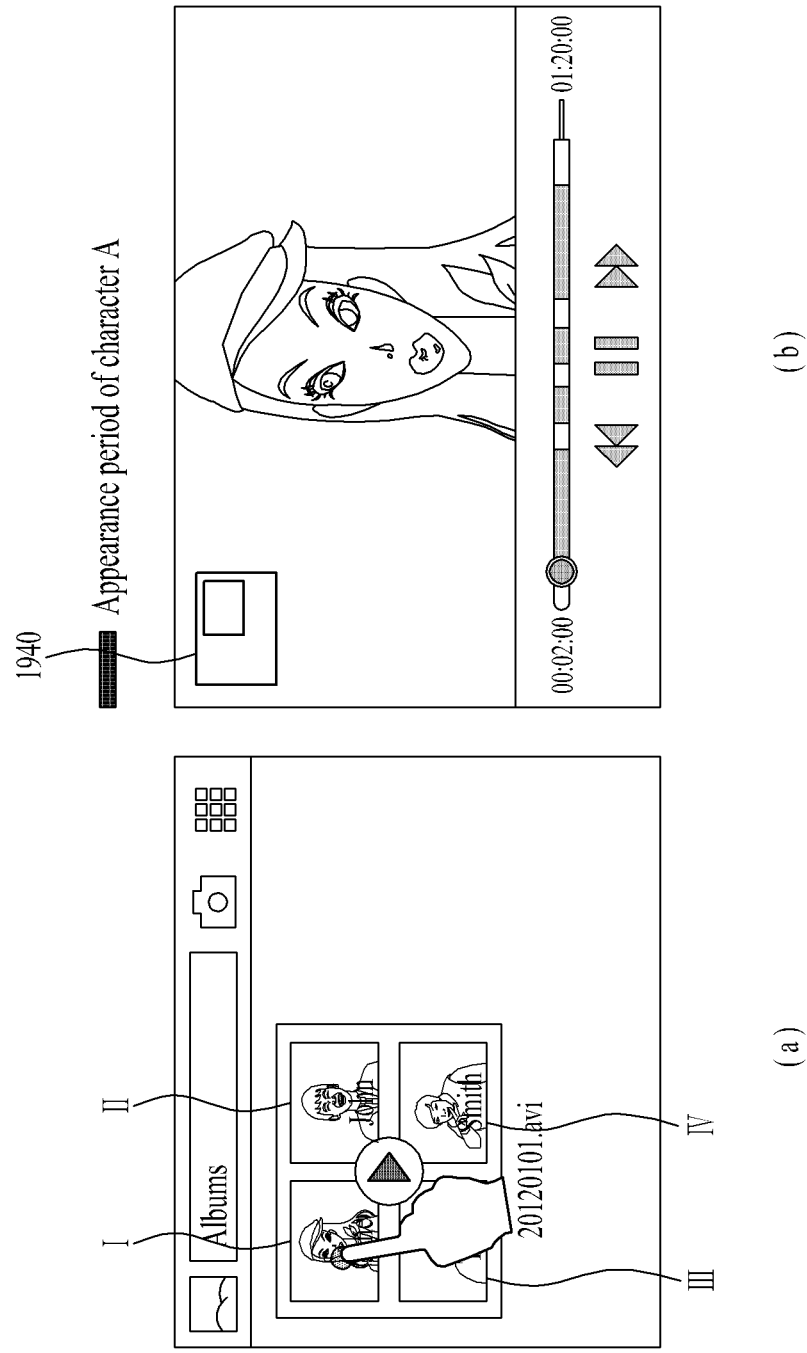

When a representative image of a specific character is selected, the controller 180 may play the video during periods in which the specific character appears prominently or in which particular focus is placed on the specific character. This may mean that the video is enlarged or zoomed-in based on where the specific character appears in the frame during the portion of the video. For example, when the first representative image I representing the specific character is touched as shown in FIG. 19B(a), the controller 180 may control the video to be enlarged during playback to focus in on the specific character as shown in FIG. 19B(b). In a case in which the video is enlarged based on the specific character, the controller 180 may display a zoom indicator while playing the enlarged video indicating the position and size of the displayed region with respect to the entire frame of the video such that a user can estimate the position and size of the enlarged region.

When a user touches a representative image which is created based on text corresponding to converted voice audio, the controller 180 may playback only the audio corresponding to the period of the video represented by the representative image without outputting the video portion of the video. It is possible to minimize power consumption of the mobile terminal 100 by playing back only the audio portion of the video to be output without outputting the video portion of the video.

The controller 180 may decide whether only the audio portion of the video is to be output based on the state of the mobile terminal 100. For example, in a case in which the mobile terminal 100 is in a power saving mode or the remaining power capacity of the mobile terminal 100 is at a predetermined level or less, the controller 180 may playback only the audio portion of the video without outputting the video portion in order to minimize power consumption of the mobile terminal 100.

According to one embodiment of the present invention, if the representative image includes another person or party who was involved with a previous event related to the mobile terminal, the controller 180 may initiate a communication operation with that person or party when the representative image is touched or selected. An example of such an embodiment will be described in detail with reference to FIG. 20.

FIG. 20 is a diagram showing an example in which a screen to communicate with another person or party corresponding to a representative image selected by a touch is displayed. For the convenience of description, representative images contained in a thumbnail will be referred to as first to fourth representative images I to IV in a clockwise direction.

When the representative image region is touched, the controller 180 may control a screen to be displayed to communicate with the person or party corresponding to the representative image selected by the touch. For example, when the first representative image I is touched as shown in FIG. 20(a), the controller 180 may control a popup window 2010 to be displayed listing communication options to communicate with the person or party corresponding to the first representative image I as shown in FIG. 20(b). Here, communication options to communicate with a specific person or party may include a text message, telephone communication, an SNS, or messaging.

When any one of the communication options is selected through the popup menu shown in FIG. 20(b), the controller 180 may control a corresponding application to be executed. For example, when a Messaging option is selected in FIG. 20(b), the controller 180 may control a text message application to be displayed. At this time, the controller 180 may further control the corresponding application such that the person or party corresponding to the first representative image I is automatically designated or populated as a recipient of the selected communication application.

Although not shown, the controller 180 may control information regarding the person or party corresponding to the representative image to be searched for on the web. Specifically, the controller 180 may search for the person or party via a portal search site using information related to the person or party, such as name or image.

The mobile terminal 100 according to the embodiment of the present invention may distinguish between a first type touch input and a second type touch input to the representative image region. When the first type touch input is input, the playing of the video may be started from a time indicated by the representative image or the video may be played only during the period represented by the representative image selected by the touch as illustrated in FIGS. 16 to 19. When the second type touch input is input, a screen to communicate with the person or party corresponding to the selected representative image may be displayed as in the example shown in FIG. 20.

Here, the first type touch input and the second type touch input may be any selected from among a simple touch (a touch to the representative image region being released within a predetermined time), a long touch (a touch to the representative image region being maintained for a predetermined time), or a plurality of tapping inputs (the representative image region being touched a plurality of times within a time period).

The embodiment of FIG. 4 illustrates that the controller 180 creates a plurality of representative images from a video to create a thumbnail of the video. According to another embodiment of the present invention, the control 180 may combine a representative image created from a video and a representative image of a photograph related to the video to create a thumbnail of the video. The controller 180 may select a photograph related to the video based on a capture time, a capture location, or a person or character appearing in the photograph. For example, the controller 180 may select a photograph taken before or after the video recording (or a photograph taken on the same date as the video), a photograph taken at the same location as the video, or a photograph containing the same person or character as the video. Here, a representative image of a photograph related to the video may mean a thumbnail of the photograph.

For example, FIG. 21 is a diagram showing an example in which a representative image of video and a representative image of a photograph related to the video are combined to create a thumbnail of the video.

The controller 180 may combine representative images 2110 and 2120 extracted from video and photographs 2130 and 2140 related to the video to create a thumbnail of the video as in an example shown in FIGS. 21(*a*) and 21(*b*). In order to distinguish between the representative images extracted from the video and the representative images of the photographs related to the video, the controller 180 may control an indicator 2150 to be displayed indicating whether a representative image was extracted from the video or is a photograph related to the video as shown in FIG. 21(*b*) (FIG. 21(*b*) illustrates that indicators 2150 are displayed on only the representative images of the photographs related to the video).

At this time, in a case in which the touched representative image represents a photograph related to the video, the controller 180 may control the photograph to be displayed.

According to an example of the present invention, the controller 180 may display a thumbnail of a folder containing multimedia files, such as videos and photographs. In a case in which a plurality of multimedia files belongs to the folder, the controller 180 may combine at least some of the multimedia files belonging to the folder to create a thumbnail of the folder.

Figure 22:
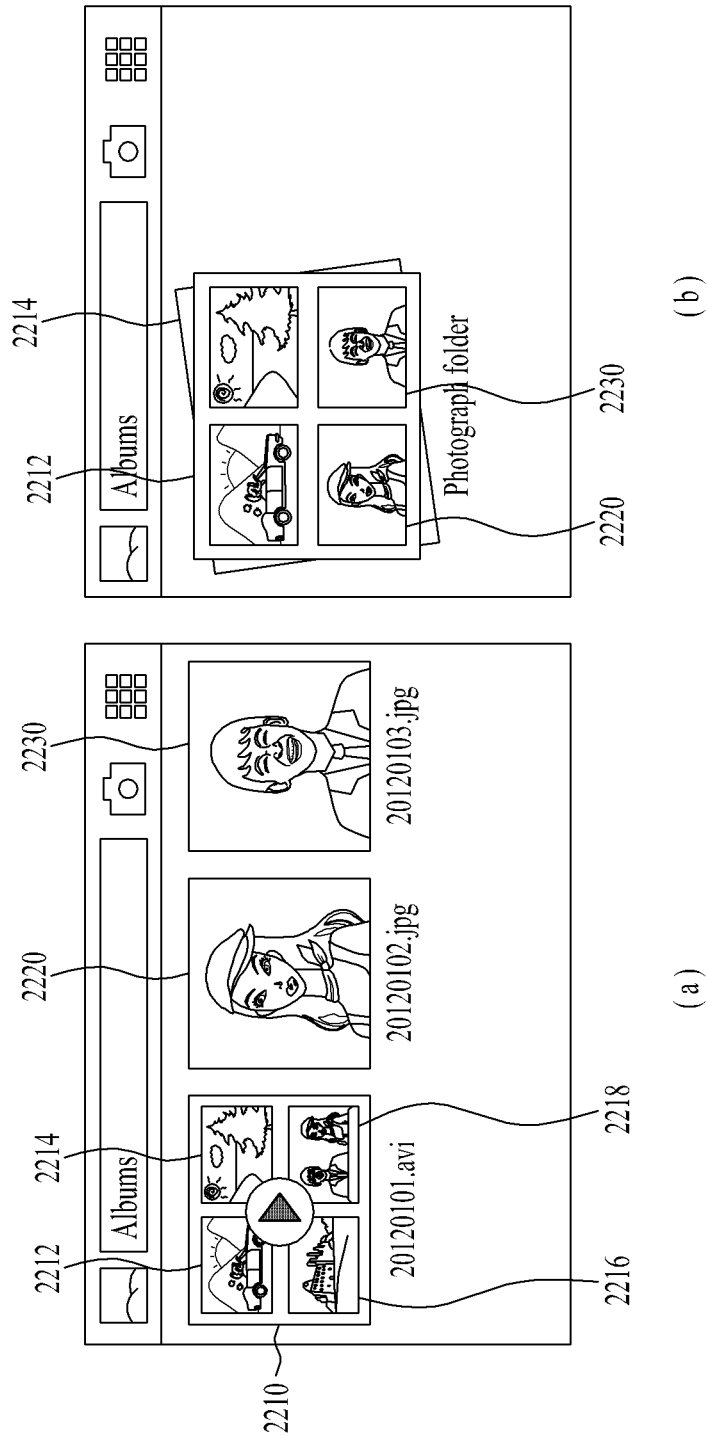
FIG. 22 is a diagram illustrating an example in which a thumbnail of a folder is created.

For example, FIG. 22 is a diagram illustrating an example in which a thumbnail of a folder is created. FIG. 22(*a*) is a view showing thumbnails 2210, 2220, and 2230 of multimedia files contained in a folder and FIG. 22(*b*) is a view showing a thumbnail of the folder. FIG. 22(*a*) illustrates that a thumbnail of video contains four representative images 2212, 2214, 2216, and 2218.

As in an example shown in FIG. 22(*b*), the controller 180 may combine the thumbnails 2212, 2214, 2220, and 2230 of the multimedia files contained in the folder to create a thumbnail of the folder. At this time, in a case in which the thumbnail 2210 of the video contains a plurality of representative images 2212, 2214, 2216, and 2218 as in an example shown in FIG. 22(*a*), the thumbnail of the folder does not necessarily need to contain all the representative images contained in the video as in an example shown in FIG. 22(*b*) but it is sufficient for the thumbnail of the folder to contain at least one of the representative images contained in the thumbnail of the video.

At this time, in a case in which the thumbnails of the multimedia files are combined to create a thumbnail of the folder, the controller 180 may sort the multimedia files based on date, file size, file name, or location of capture to determine an arrangement sequence of the thumbnails of the multimedia files. Of course, the controller 180 may restrict the number of images to be contained in the thumbnail of the folder to a predetermined number.

When the thumbnail of the folder is created, a portion of the thumbnail of the folder may be set as an entry region and the other portion of the thumbnail of the folder may be set as a link region. For example, FIG. 23 is a diagram illustrating an entry region and a link region of a thumbnail.

Figure 23:
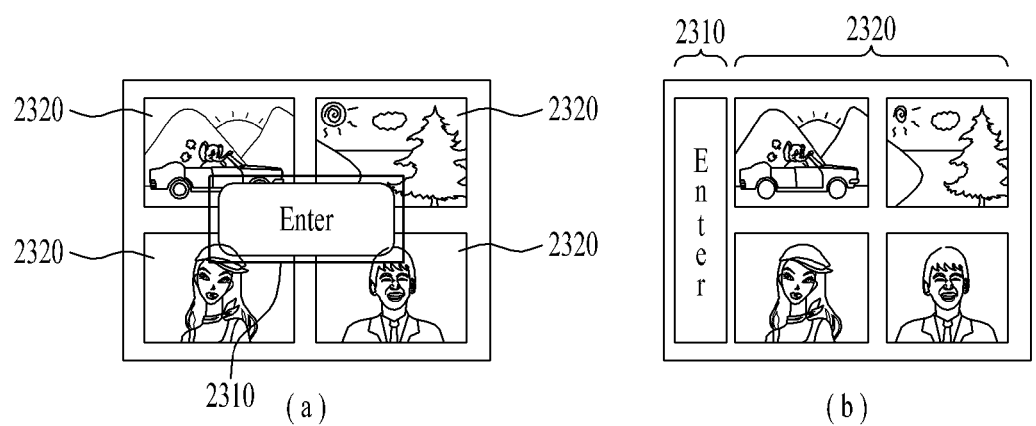
FIG. 23 is a diagram illustrating an entry region and a link region of a thumbnail.

As in an example shown in FIGS. 23(*a*) and 23(*b*), the controller 180 may set a portion of the thumbnail of the folder as an entry region 2310 and the other portion of the thumbnail of the folder as a link region 2320. FIG. 23(*a*) illustrates that the entry region 2310 is set to be located at the middle of the thumbnail and FIG. 23(*b*) illustrates that the entry region 2310 is set to be located at one end of the thumbnail.

As in the example shown in FIGS. 23(*a*) and 23(*b*), the controller 180 may control information to visually distinguish the entry region to be displayed.

When the entry region of the thumbnail of the folder is touched, the controller 180 may control a multimedia file list contained in the folder to be displayed. On the other hand, when the link region of the thumbnail of the folder is touched, the controller 180 may control a multimedia file corresponding to a position selected by the touch to be directly output without displaying the multimedia file list.

Figure 24:
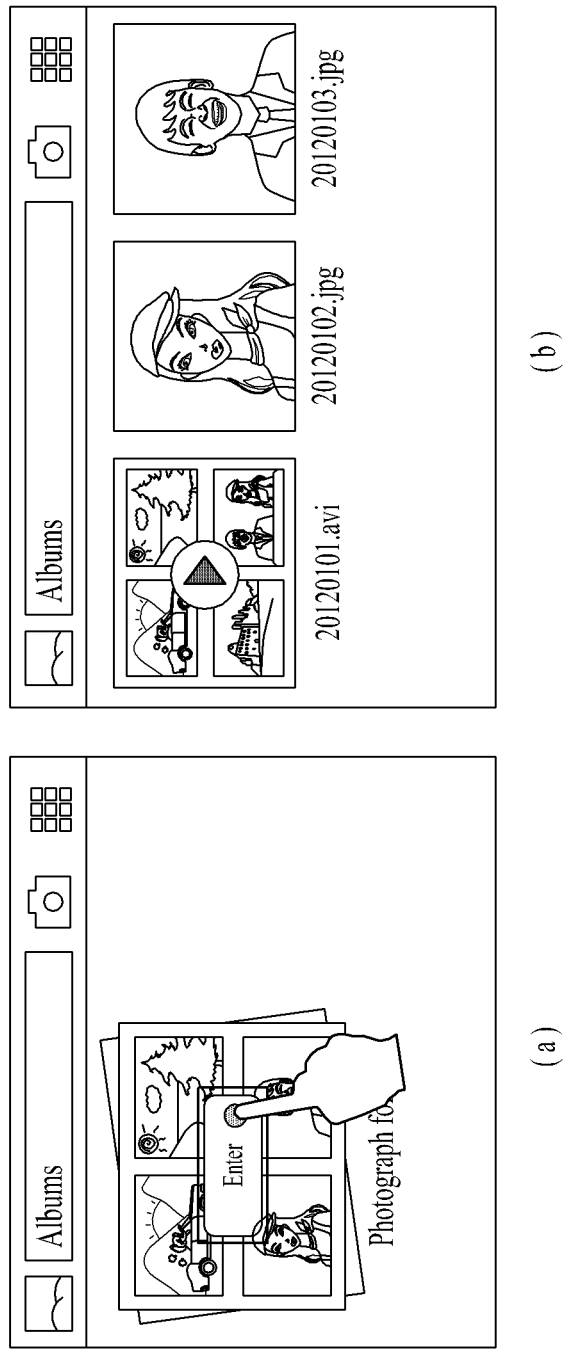
FIGS. 24 and 25 are diagrams illustrating operation of a mobile terminal when an entry region of a folder thumbnail is touched and when a link region of a folder thumbnail is touched.
Figure 25:
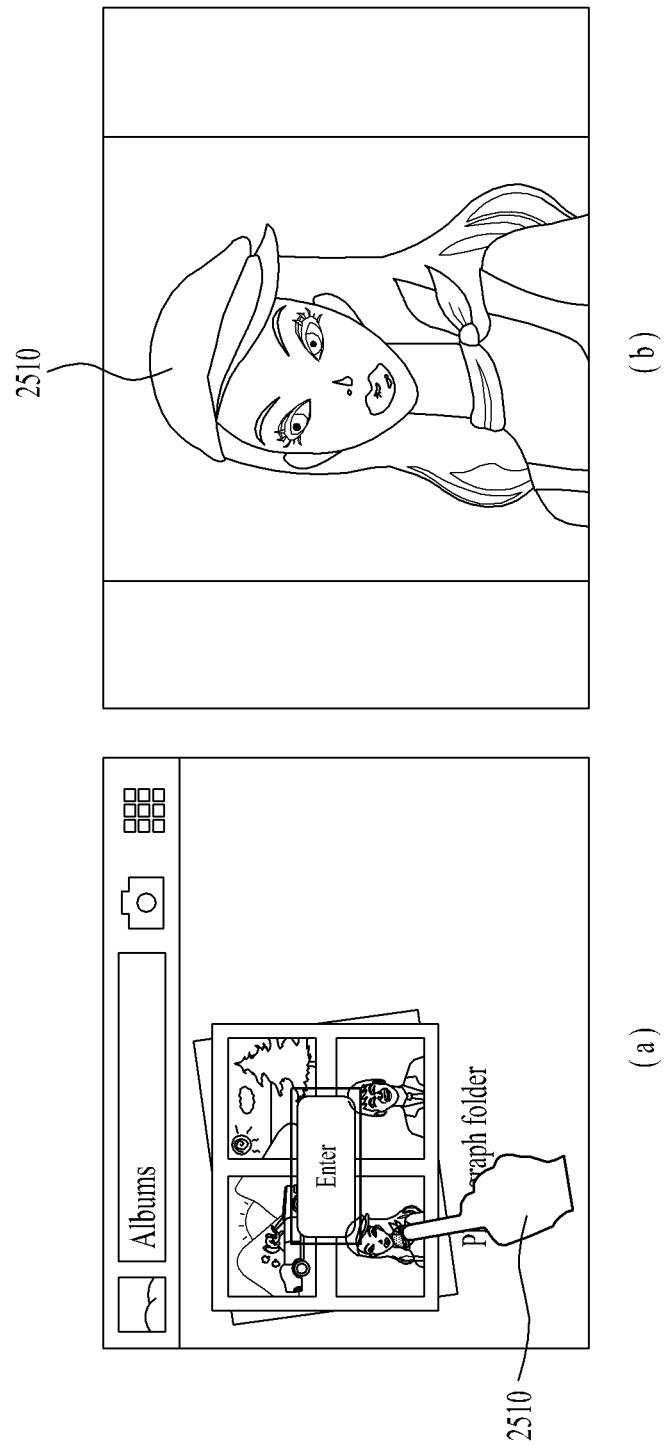

For example, FIGS. 24 and 25 are diagrams illustrating operation when an entry region of a folder thumbnail is touched and when a link region of a folder thumbnail is touched.

When the entry region of the folder thumbnail is touched as in an example shown in FIG. 24(*a*), the controller 180 may control a multimedia file list contained in the folder to be displayed as in an example shown in FIG. 24(*b*).

In another example, when the link region of the thumbnail of the folder is touched as in an example shown in FIG. 25(*a*), the controller 180 may control a multimedia file 2510 designated by touch input to be directly output as in an example shown in FIG. 25(*b*).

According to an example of the present invention, when predetermined touch input is received, the controller 180 may control a thumbnail containing a plurality of images (e.g. a thumbnail of video or a thumbnail of a folder) to be enlarged. When the thumbnail is enlarged, it is possible for the user to view a plurality of images contained in the thumbnail in more detail and to improve user convenience in manipulating the thumbnail (e.g. to increase a touch region according to the increase in area of the playing region and the representative image region).

Figure 26:
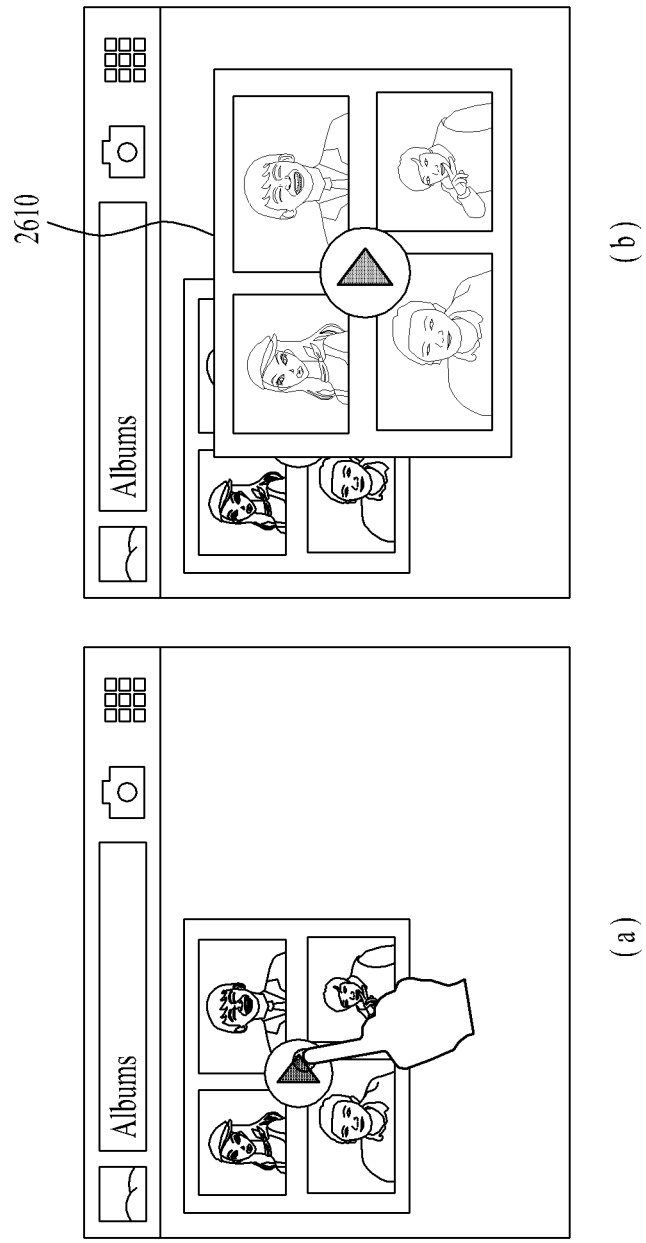
FIG. 26 is a diagram showing an example in which a displayed thumbnail containing a plurality of images is enlarged.

For example, FIG. 26 is a diagram showing an example in which a thumbnail containing a plurality of images is enlargedly displayed. When predetermined user input is received (e.g. the playing region (or the entry region) is long touched, the controller 180 may control an enlarged thumbnail to be displayed in a popup window as in an example shown in FIG. 26.

Although FIG. 26 illustrates long touch of the playing region (or the entry region) as user input to enlarge the thumbnail, touch input other than what is shown may be assigned to enlarge the thumbnail. For example, a pinch out gesture input to increase the distance between two pointers while touching the display 151 may be assigned as user input to enlarge the thumbnail. When a pinch in gesture input is received in a state in which the thumbnail is enlargedly displayed, the controller 180 may control the thumbnail to be reduced again.

FIGS. 42A and 42B illustrate that when a specific representative image representing a specific character is touched, the video is played in an enlarged size based on the character corresponding to the touched specific representative image.

On the other hand, the mobile terminal according to the embodiment of the present invention may set an object to be tracked during playing of video and enlarge the video being played based on the set object.

Hereinafter, a detailed description will be given of embodiments in which video is enlarged based on an object set as a target. In addition, expressions, such as "playing," "paused," and "recording," are used to assist understanding of the drawings in order to clarify whether video is being played, paused, or recorded. However, the above expressions are provided simply for the convenience in understanding of the drawings and, therefore, the present invention is not limited thereto. For example, although an expression "playing" is included in the drawings, functions described in the drawings may also be applied even when the video is "paused" or "being recorded."

As the video is played in an enlarged size, the terms "whole region" and "focus region" are inserted when referring respectively to the entire region of the video or a zoomed in portion of the video being displayed in an enlarged size.

Hereinafter, operation of the mobile terminal 100 according to the embodiment of the present invention will be described in detail with reference to the accompanying drawings.

Figure 27:
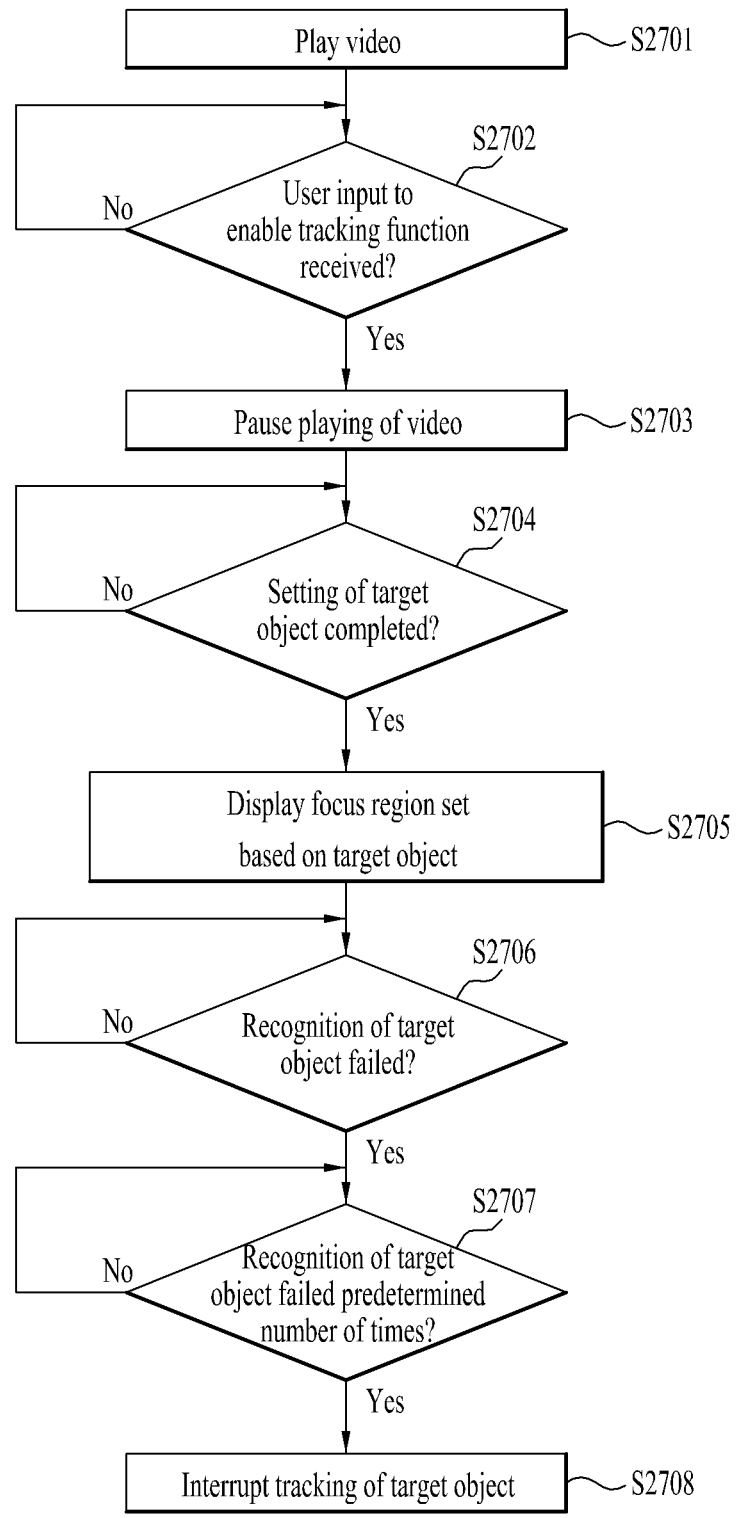
FIG. 27 is a flowchart showing operation of a mobile terminal according to one embodiment of the present invention.

FIG. 27 is a flowchart showing operation of a mobile terminal according to one embodiment of the present invention. Referring to FIG. 27, first, the controller 180 may control video to be played and the played video to be output through a touchscreen (S2701). The video described in the present invention may mean video stored in the memory 160, video received from a remote terminal (or server) and played in a streaming mode, video received in real time from a terminal of another person or party for communication during video communication, and video recorded in real time through the camera 121.

When user input to enable a tracking function is input from a user while the video is being output through the touchscreen (S2702), the controller 180 may pause playing of the video until a target object, among objects displayed in the video, is set (S2703). Here, the tracking function may mean a series of functions to track and display motion of any one of the objects displayed on the video and the objects may mean people, animals, and things.

FIG. 28 is a diagram illustrating an example in which playing of video is paused in response to user input to enable a tracking function.

When user input to enable a tracking function is received while video is being played as in an example shown in FIG. 28(*a*) (e.g. a 'smart tracking' button 510 shown in FIG. 28(*a*) is touched), the controller 180 may control playing of the video to be paused and a video frame to be output as in an example shown in FIG. 28(*b*). In a case in which the playing of the video is interrupted in order to set a target object, a message may be displayed showing an example of a user input to enable a tracking function, as well as a tracking icon 520 which can be used to set the target object to be displayed as in an example shown in FIG. 28(*b*).

FIG. 28(*a*) illustrates touching the predetermined button ('smart tracking' button) 2810 as user input to enable a tracking function. However, such illustration is merely for the convenience of the description and, therefore, the present invention is not limited thereto. For example, tapping the touchscreen a predetermined number of times during the playing of the video, flicking a pointer in a predetermined direction, simultaneously touching N number of pointers to the touchscreen, or flicking N number of pointers in a predetermined direction may be set as user input to enable the tracking function, as well as any other gestures or touch combinations without limitation.

In a case in which the resolution of the video during playback is less than predetermined resolution, the controller 180 may control the playing of the video to be paused. In a case in which the resolution of the video during playback is greater than the predetermined resolution, on the other hand, the controller 180 may output a message to inform that the tracking function cannot be enabled in the video and the playback continued without application of the following process. When the resolution of the video is too high, the computation amount required by the controller 180 is increased, with the result that power consumption may be increased and performance may be deteriorated due to heat generated therefrom. For this reason, the tracking function may be enabled only in a case in which the resolution of the video is equal to or less than the predetermined resolution, however, these considerations shall not be construed as limiting the present disclosure.

When user input to enable the tracking function is input from a user while the video is being output through the touchscreen (S2702), the controller 180 may pause playing of the video until a target object, among objects displayed in the video, is set (S2703).

The user may select or unselect at least one of objects displayed in a still image to decide an object to be set as a target object. Here, various input examples may be applied as user input to select or unselect at least one of the objects displayed in the still image. For example, an object to be set as a target object may be selected or unselected by simply touching one object displayed in the still image, dragging a tracking icon (e.g. the tracking icon 2820 of FIG. 28(*b*)) displayed in the still image onto an object to be set as a target object, and touching at least one of icons representing candidate objects (see FIG. 29(*b*), which will hereinafter be described). In addition to the above-described methods, object selecting or unselecting methods that can be obviously invented by those of ordinary skill in the art to which the present invention pertains falls within the protection scope of the current disclosure.

While the playing of the video is paused and a vide frame still image at predetermined time is being output, the controller 180 may control candidate objects that can be set as a target object to be visually distinguished. For example, FIG. 29 is a diagram illustrating an example in which candidate objects that can be set as a target object are visually distinguished.

The controller 180 may control image objects 612 and 614 (illustrated as a square frame in FIG. 29(*a*)) indicating candidate objects which can be set as a target object to be displayed in the vicinity of the candidate objects as in an example shown in FIG. 29(*a*).

In another example, controller 180 may control icons 622 and 624 representing candidate objects which can be set as a target object to be displayed at one side of the touchscreen as in an example shown in FIG. 29(*b*). In this case, touch input for at least one of the icons 622 and 624 representing the candidate objects may be set as user input to set the candidate objects as the target object.

In addition to the example shown in FIGS. 29(*a*) and 29(*b*), the controller 180 may enlarge or reduce the display size of the candidate objects which can be set as the target object or change a color of the candidate objects to inform the user of the candidate objects which can be set as the target object. In addition to the above-described methods, candidate object distinguishing methods that can be obviously invented by those of ordinary skill in the art to which the present invention pertains fall within the protection scope of the current disclosure.

The playing of the video does not necessarily need to be paused in response to the user input to enable the tracking function. Although the user input to enable the tracking function is received, the controller 180 may set a target object while continuing to play the video. As described with reference to FIG. 29, the controller 180 may control the candidate objects that can be set as the target object to be visually distinguished while playing the video. In a case in which the video is continuously played, however, the candidate objects that can be set as the target object and the position of the candidate objects may be changed over time.

When the tracking function is enabled and setting of the target object is completed (S2704), the controller 180 may control at least a portion of the video to be set as a focus region which is changed according to the motion of the target object during the video and then set focus region to be displayed through the touchscreen (S2705). That is, the controller 180 may control the video to be played based on the set target object.

FIG. 30 is a diagram illustrating an example in which at least a portion of video is set as a focus region. For the convenience of description, it is assumed that two characters are displayed in the video and the two characters will be referred to as a first character I and a second character II.

When one of the first and second characters I and II, e.g. the second character II, is set as a target object, the controller 180 may set at least a portion of the video as a focus region based on the target object. That is, the controller 180 may control a focus region 3010, of the whole region of the video, to be set based on the target object (i.e. the second character II) as in an example shown in FIG. 30(*a*).

When the position of the second character II set as the target object as the video is changed, the controller 180 may control the position of a focus region 3020 to be changed according to the second character II as in an example shown in FIG. 30(*b*). At this time, a tracking algorithm, such as a face recognition algorithm, a shape recognition algorithm, or a color recognition algorithm, may be used as an algorithm to track motion of the target object. The tracking algorithm is well-known technology and, therefore, a detailed description thereof will be omitted.

The size of the focus region, specifically a ratio of the focus region to the whole region of the video, may have a fixed value irrespective of the size of the target object. In another example, the controller 180 may control the size of the focus region to be changed according to the size of the target object. An example in which the size of the focus region is changed according to the size of the target object will be described in detail with reference to FIG. 31.

FIG. 31 is a diagram illustrating an example in which the size of a focus region is changed. For the convenience of description, it is assumed that one of first and second characters I and II, e.g. the second character II, is set as a target object.

As in an example shown in FIG. 31(*a*), the controller 180 may control a focus region 810 to be set based on the second character II set as the target object. At this time, a ratio of the focus region 810 to the whole region of the video may be decided according to the size of the second character II in the video. In a case in which the size of the second character II is decreased as the video is played, the controller 180 may control a ratio of a focus region 820 to the whole region of the video to be decreased as in an example shown in FIG. 31(*b*). Although not shown, when the size of the second character II is increased, on the other hand, the controller 180 may control a ratio of the focus region to the whole region of the video to be increased.

When the target object is set, only the focus region of the video, not the whole region of the video, may be output. The controller 180 may emphasize and output a voice of the target object while outputting the focus region. For example, when the second character II is set as the target object as in the example shown in FIG. 31(*a*), the controller 180 may control the output level (or volume) of a voice signal determined as the voice of the second character II to be raised higher than other sounds, such that the voice of the character set as the target object is emphasized and output. The controller 180 may extract a voice signal of the target object based on a detected motion of the mouth or lips of the target object. Alternatively, the controller 180 may extract a voice signal of the target object based on the position of the target object in a stereo environment.

At this time, the controller 180 may control a zoom indicator indicating the position and size of the focus region, of the whole region of the video, to be displayed such that a user can estimate the position and size of the focus region. For example, FIG. 32 is a diagram illustrating an example in which a zoom indicator is output. When a focus region 910 is set based on the target object as in an example shown in FIG. 32(*a*), the controller 180 may control the set focus region 910 to be displayed as in an example shown in FIG. 32(*b*) while playing the video. At this time, the controller 180 may control a mini map 920 indicating the position and size of the focus region 910, of the whole region of the video, to be displayed as in the example shown in FIG. 32(*b*). In the mini map shown in FIG. 32(*b*), an outer rectangle 922 may correspond to the whole region of the video and an inner rectangle 924 may correspond to the focus region 910.

The controller according to the present invention may set at least one object as a target object based on user input. That is, the target object does not necessarily mean a single object. In a case in which a plurality of objects is set as target objects, the controller 180 may control a plurality of playing windows to be output and focus regions of the target objects to be output through the respective playing windows. Operation of the mobile terminal 100 when a plurality of target objects is set as target objects will be described with reference to FIG. 33.

FIG. 33 is a diagram illustrating the output of a touchscreen when a plurality of target objects is set. For the convenience of description, it is assumed that two characters displayed in video are set as target objects.

When a plurality of target objects is set as target objects, the controller 180 may set a focus region for each target object as in an example shown in FIG. 33(*a*). Specifically, the controller 180 may set a first focus region 1010 based on a first character I and a second focus region 1020 based on a second character II as in an example shown in FIG. 33(*a*).

When the focus region for each target object is set, the controller 180 may control a plurality of playing windows 1030 and 1040 corresponding to the target objects to be output and each focus region to be displayed through a corresponding one of the playing windows as in an example shown in FIG. 33(*b*). Specifically, the controller 180 may control the first focus region 1010 for the first character I to be output through the first playing window 1030 and the second focus region 1020 for the second character II to be output through the second playing window 1040 as in an example shown in FIG. 33(*b*).

The position and size of the first playing window 1030 and the second playing window 1040 shown in FIG. 33(*b*) are merely illustrative and, therefore, the present invention is not limited thereto. The first playing window 1030 and the second playing window 1040 may have different sizes. In addition, the first playing window 1030 and the second playing window 1040 may be displayed in an overlapping fashion. For example, the second playing window 1040 may be displayed in the first playing window 1030 as picture in picture (PIP).

Since video is recorded using the camera 121 which is moved or video is recorded for a moving subject, a target object may not appear in the video at all times or such a target object may not be able to be tracked due to technical limitations of a tracking algorithm. In a case in which the target object cannot be tracked as the video is played (S2706), the controller 180 may retry recognition of the target object after a predetermined time.

When recognition of the target object continuously fails N number times (S2707), the controller 180 may control tracking of the target object to be interrupted or playing time of the video to be changed to a point in the video when the target object reappears (S2708). Here, N is a natural number including 1 and may be a value that can be adjusted by the user. When N is set to 1, tracking of the target object may be interrupted or playing time of the video may be changed immediately when the recognition of the target object fails.

Hereinafter, a case in which tracking of a target object is interrupted and a case in which playing time of video is changed to a point of reappearance of a target object will be described in detail with reference to the accompanying drawings.

Figure 34:
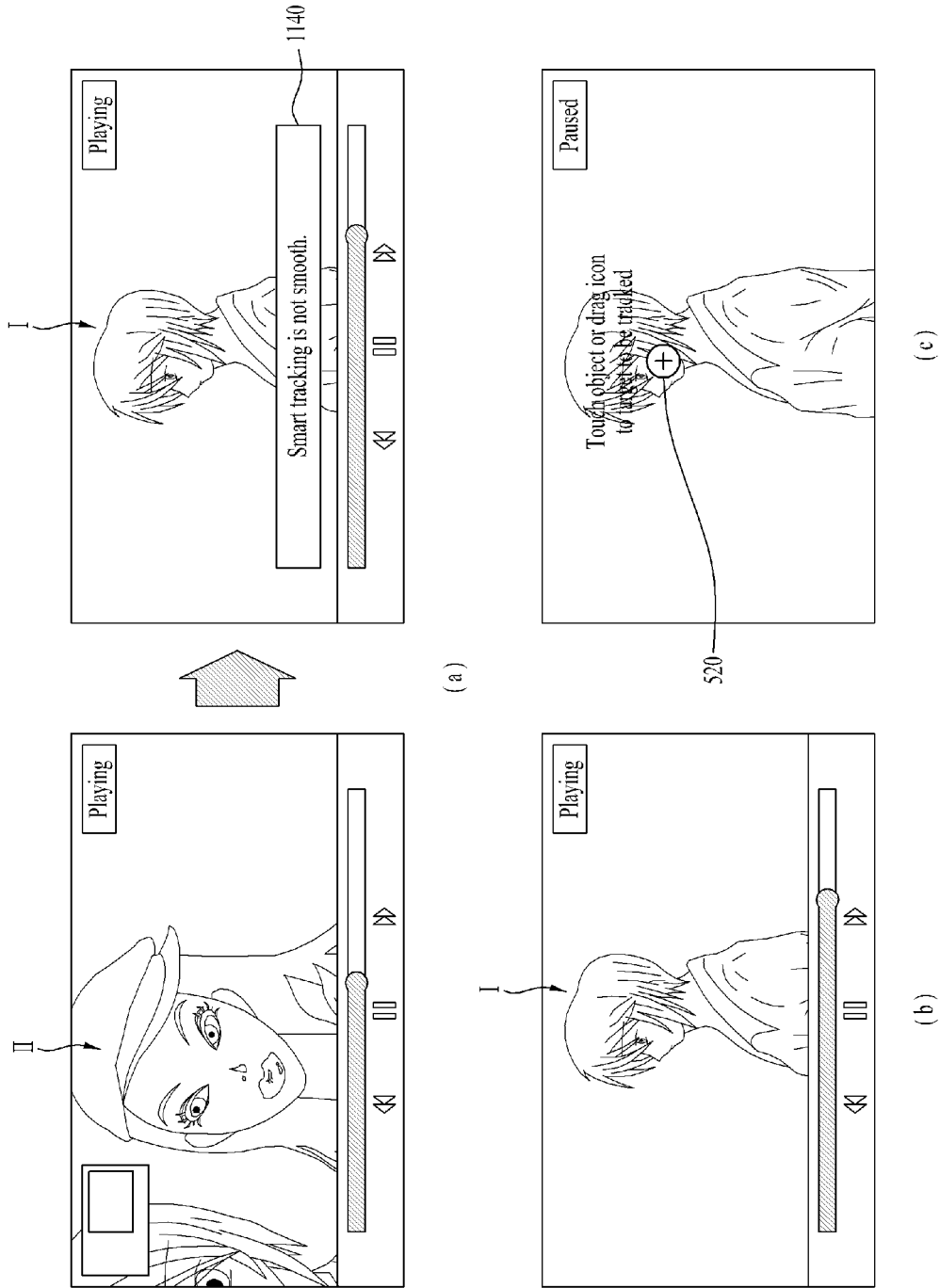
FIGS. 34(a) to 34(c) are diagrams illustrating the change in output of a touchscreen when tracking of a target object is interrupted.

When tracking of the target object is interrupted the controller 180 may control the whole region of the video to be output or may pause the video such that the user can reset the target object as at the previous step S2702. For example, FIG. 34 is a diagram illustrating the change in output of a touchscreen when tracking of a target object is interrupted. When the focus region set based on the target object (e.g. the second character II) is output and then the target object does not appear in the video (e.g. only the first character I appears in the video) as in an example shown in FIG. 34(*a*), the controller 180 may control a popup window 1110 indicating that the target object cannot be recognized from the video to be displayed.

When the recognition of the target object continuously fails N times, the controller 180 may interrupt tracking of the target object and may control the whole region of the video to be output (if the focus region was being displayed in an enlarged size) while playing the video as in an example shown in FIG. 34(*b*). Alternatively, the controller 180 may interrupt tracking of the target object and may control the playing of the video to be paused such that the user can reset the target object as in an example shown in FIG. 34(*c*). When the playing of the video is paused, an information message and a tracking icon may be displayed as previously described with reference to FIG. 28.

Figure 35:
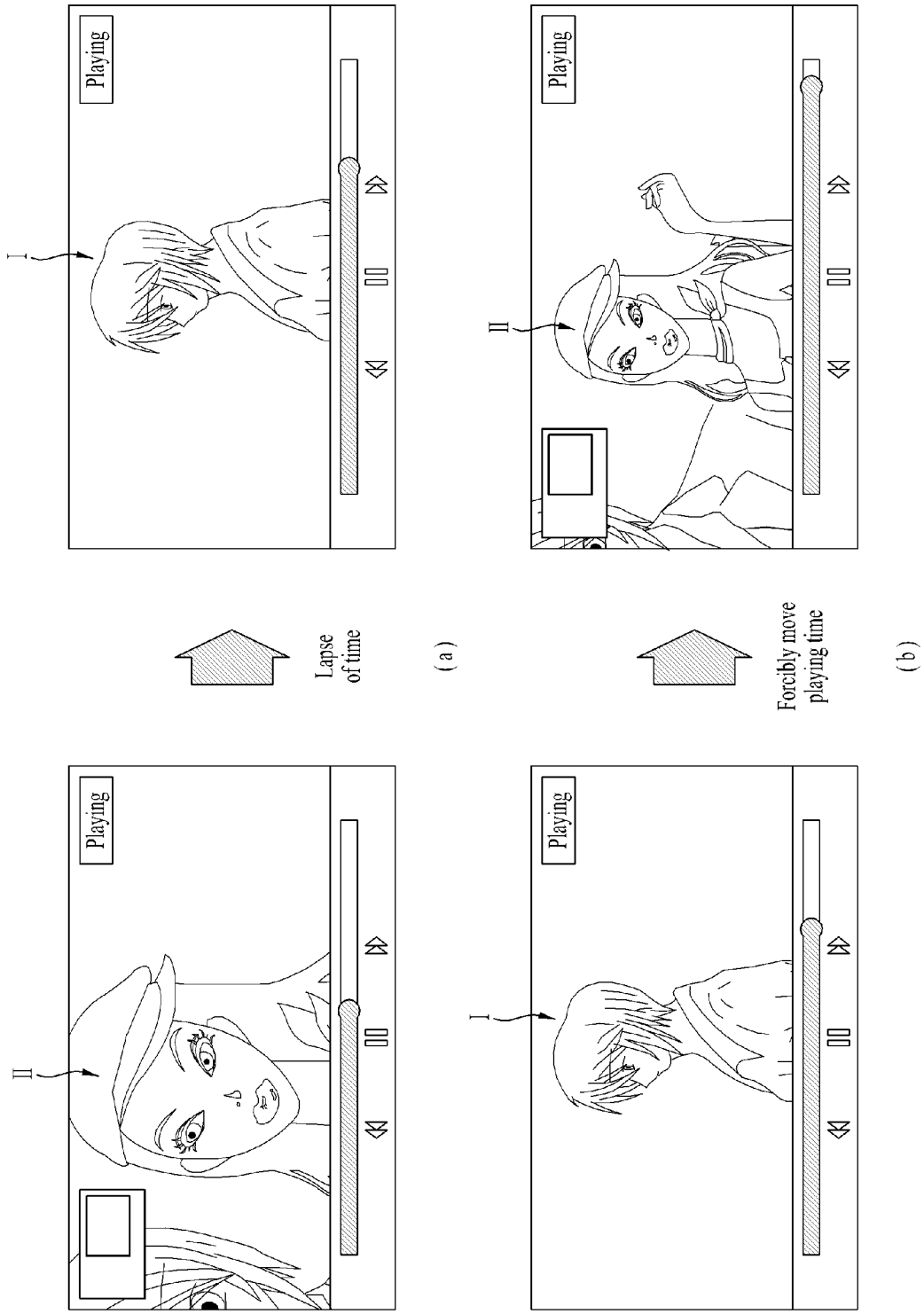
FIGS. 35(a) and 35(b) are diagrams illustrating an example in which a current playing position of a video is changed to a position corresponding to a reappearance of a target object.

In another example, when the recognition of the target object continuously fails N times, the controller 180 may control the video to be automatically played at a point in which the target object reappears in the video. For example, FIG. 35 is a diagram illustrating an example in which playing time of video is changed to a reappearance point of a target object. When a focus region based on the target object is being output (e.g. the second character II) and the target object no longer appears in the video (e.g. only the first character I appears in the video) as in example FIG. 35(*a*), the controller 180 may cause the video to be automatically played at a point in which the target object reappears in the video (e.g. the second character II) and further cause the focus region to be reset based on the target object such that the focus region is output as in an example shown in FIG. 35(*b*). That is, the controller 180 may control the playing time of video to be changed to time when the target object reappears at the next point in time of the remaining playing period of the video.

In a case in which the target object does not reappear over the remaining playing period of the video, the controller 180 may terminate tracking and control tracking of the target object to be finished at time when the recognition of the target object fails as in the example shown in FIG. 34.

When the target object is set, the controller 180 may display a period during which the target object appears to be displayed in a visually distinguished state while outputting a playing status display bar indicating the playing time of the video. For example, FIG. 36 is a diagram illustrating an example in which a period during which the target object appears is distinctly displayed or indicated on a playing status display bar. When the target object appears over a total of three periods d1 to d3 of the whole playing period of the video, the controller 180 may control the periods d1 to d3 in which the target object appears to be visually distinguished (e.g. the periods d1 to d3 may be expressed using predetermined colors) on the playing status display bar as in an example shown in FIG. 36(*a*).

In another example, the controller 180 may control only the start points of the three periods in which the target object appears to be visually distinguished as in an example shown in FIG. 36(*b*). FIG. 36(*b*) illustrates an example in which indication windows 1312, 1314, and 1316 indicating the respective start points of the three periods d1 to d3 are displayed while images corresponding to the start points indicated by the indication windows 1312, 1314, and 1316 are displayed.

FIG. 36(*a*) and FIG. 36(*b*) merely show an example in which the appearance time of the target object or the period during which the target object appears is visually distinguished and, therefore, the present invention is not limited thereto. Unlike the example shown in FIG. 36(a) and FIG. 36(b), the controller 180 may control an image object, such as a marker, to be displayed at the start point at which the target object appears and the end point which the target object appears such that the periods in which the target object appears or the start points at which the target object appears are distinguished.

In the above embodiments, when at least a portion of the video is set as a focus region, the set focus region is output through the touchscreen. According to another embodiment of the present invention, the controller 180 may control only the target object display region to be extracted from the video, and exclude the background from the video being displayed, such that only the extracted target object display region is isolated and displayed on the touchscreen. For example, FIG. 37 is a diagram illustrating an example in which a target object extracted from video is displayed. In a case in which the second character II is set as the target object in the video in which the first character I and the second character II are displayed (see in FIG. 37(a)), the controller 180 may control only the target object to be isolated and extracted from the video and only the extracted target object to be displayed as in an example shown in FIG. 37(b). That is, the controller 180 may control the video to be played in a state in which the remaining region of the video excluding the target object display region is deleted or not displayed.

When the focus region is set based on the target object, the user may not properly view other objects located out of the focus region. In order to view objects other than the object set as the target object or to set another object as the target object, therefore, the user may further control the video being played by enlarging or reducing the ratio of the focus region change or moving the focus region within the screen.

When such user input is received, the controller 180 may control the focus region to be enlarged or reduced or the focus region to be moved according to the user input such that the isolating focus region is manually set based on the user input.

When a user input to manually change the isolating focus region is input, the controller 180 may control the isolating focus region to be manually set by the user to be displayed while playing the video. Alternatively, the controller 180 may control the playing of the video to be paused and the isolating focus region to be manually set by the user to be displayed. In the latter case, the controller 180 may control the playing of the video to be paused until the user resets the target object. When the playing of the video is paused, candidate objects may be displayed while being visually distinguished to inform about the candidate objects which can be set as the target object as in the example shown in FIG. 29.

FIG. 28 illustrates that the touch object can be set by applying the predetermined user input to one of the objects displayed in the video. However, the target object does not necessarily need to be manually set as in the example shown in FIG. 28. When an event is generated, the controller 180 according to one example of the present invention may automatically set an object corresponding to another person or party involved with an event related to the mobile terminal as a target object. Here, the event may include an outgoing or incoming telephone communication or outgoing or incoming message communication. Hereinafter, an example in which the controller 180 automatically sets a target object will be described with reference to FIG. 38.

FIG. 38 is a diagram illustrating an example in which an object corresponding to another person or party involved with an event is automatically set as a target object. When a telephone call is received from the second person II displayed in the video while the video displaying the first character I and the second character II as shown in FIG. 38(a), the controller 180 may set the second character II as a target object. Subsequently, the controller 180 may set a focus region based on the second character II who has initiated the telephone call and may display an information window 1510 informing that the second character II has initiated the telephone call while the set focus region is being output as in an example shown in FIG. 38(b).

If the other person or party who has initiated the event (i.e. the other party who has initiated the telephone call) is not displayed when the event occurs, the controller 180 may control the playing time of the video to be changed to a point when the person or party does appear.

In a case in which user input to disable the tracking function is input at any time while the focus region following the motion of the target object is displayed, the controller 180 may interrupt tracking of the target object. When the tracking function is interrupted, the controller 180 may control the whole region of the video to be output through the touchscreen as in the example shown in FIG. 34.

Figure 39:
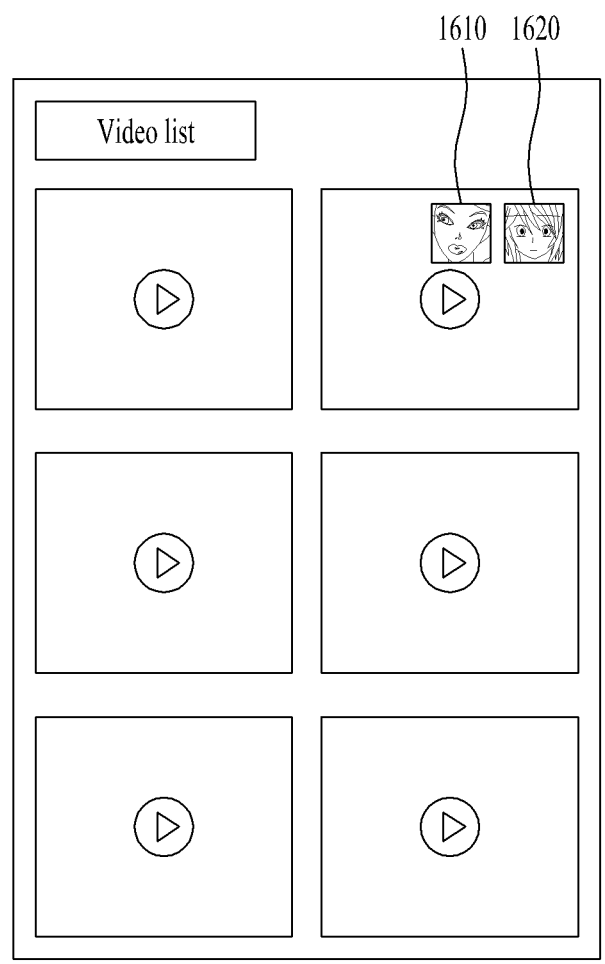
FIG. 39 is a diagram illustrating an example in which a list of candidate objects is displayed in a video playing list.

In displaying a video playing list, the controller 180 according to one example of the present invention may control candidate objects appearing in the corresponding videos that can be set as a target object to be displayed. For example, FIG. 39 is a diagram illustrating an example in which a list of candidate objects is displayed in a video playing list. The controller 180 may control candidate objects (specifically, icons 1610 and 1620 representing the candidate objects) that can be set as a target object in the video, to be displayed while displaying the list as in an example shown in FIG. 39.

The user may check important objects appearing in the video through the candidate objects. When the user selects one of the candidate objects (e.g. touches any one of the icons 1610 and 1620), the controller 180 may control the selected candidate object to be automatically set as a target object while playing the video. In addition, the controller 180 may control the video to be played starting from a point when the candidate object appears for the first time.

For all the videos displayed in the video playing list, the controller 180 may control candidate objects of each video to be displayed. Alternatively, the controller 180 may control candidate objects of each video to be displayed for some of the videos displayed in the video playing list as in the example shown in FIG. 39, but not all based on predetermined parameters or limitations of the mobile terminal.

In a case in which a large number of objects appear in the video, it may be difficult to display all candidate objects in the video playing list. For this reason, the controller 180 may restrict the number of candidate objects to be displayed. At this time, the candidate objects to be displayed in the video playing list may be set in order of appearance time of the candidate objects, appearance frequency of the candidate objects, and appearance periods of the candidate objects.

The above embodiments illustrate that at least a portion of the video is set as a focus region and the set focus region is displayed instead of displaying the whole region of the video. The mobile terminal 100 according to an example of the present invention may control the whole region of the video and the focus region to be simultaneously displayed. Hereinafter, an example in which the whole region of the video and the focus region are simultaneously displayed will be described on the assumption that the video is recorded in real time using the camera 121. However, it is obvious that the following embodiments may also be applied to videos which are not recorded in real time.

FIG. 40 is a diagram illustrating an example of user input to set a focus region during video recording. During video recording, the controller 180 may set a focus region in response to the user input. The user input to set the focus region may be touching an object displayed in the video as in an example shown in FIG. 40(*a*), touch input of a path or an outline surrounding a portion to be set as a focus region as in an example shown in FIG. 40(*b*), or touch input of a diagonal path defining a diameter or diagonal distance of an area to be set as a focus region as in an example shown in FIG. 40(*c*). The focus region may be set through various kinds of user input in addition the examples shown in FIG. 40.

When the focus region is set, the controller 180 may control a sub-playing window to display the focus region which is to be displayed on a main playing window of the video. For example, FIG. 41 is a diagram illustrating an example in which a sub-playing window is displayed on a main playing window. When user input to set a focus region is input as in an example shown in FIG. 41(*a*), the controller 180 may control a sub playing window 1820 to display the focus region to be displayed on a main playing window 1810 of the video as in an example shown in FIG. 41(*b*). The whole region (or at least a portion) of the video may be output to the main playing window 1810 of the video and the focus region may be output to the sub-playing window 1820 of the video. The controller 180 may control an image object 1830 (illustrated as a frame surrounding the focus region in FIG. 41(*b*)) to visually distinguish the set focus region to be displayed as in the example shown in FIG. 41(*b*). Consequently, the user may easily recognize a portion output through the sub-playing window 4120. The position of the focus region may be changed based on a motion of the target object. Alternatively, the position of the focus region may be fixed.

The display position of the main playing window and the size of the main playing window may be manually adjusted by the user. For example, when the user touches the main playing window and then drags and drops the touched main playing window to a desired position, the controller 180 may control the display position of the main playing window to be changed. In addition, when the user touches the edge (or the frame) of the main playing window and then drags and drops the touched edge of the main playing window in an inward direction or in an outward direction of the main playing window, the controller 180 may control the size of the main playing window to be changed.

In the same manner, the position and size of the focus region may be changed. Particularly, when the main playing window and the sub-playing window are simultaneously output, the user can view the whole region of the video through the main playing window. Consequently, the user can easily change the position and size of the focus region. An example in which the position of a focus region is changed and an example in which the size of a focus region is changed will be described in detail with reference to FIGS. 42 and 43.

FIG. 42 is a diagram illustrating an example in which the position of a focus region is changed. When the user touches within the focus region of a main playing window 1910 (or an image object 1930 identifying the focus region) and then drags and drops the focus region to a desired position as in an example shown in FIGS. 42(*a*) and 42(*b*), the controller 180 may control the focus region to be moved to the position to which the focus region has been dropped by the user. As the focus region is moved, a sub-playing window 1920 may also output the moved focus region.

FIG. 43 is a diagram illustrating an example in which the size of a focus region is changed. When the user touches within the image object 2030 identifying the focus region (or within the focus region itself) and then drags and drops to a desired position as in an example shown in FIG. 43(*a*), the controller 180 may control the size of the focus region to be enlarged or reduced to the position to which the image object has been dropped by the user. In a case in which the position to which the image object has been dropped by the user is inside the focus region, the size of the focus region is reduced. In a case in which the position to which the image object has been dropped is outside the focus region, on the other hand, the size of the focus region is enlarged. FIGS. 43(*b*) and 43(*c*) illustrate that the size of the focus region is enlarged.

When the size of the focus region is changed, the controller 180 may control the focus region, the size of which is changed, to be output through a sub-playing window 2020. At this time, the controller 180 may control the sub-playing window 2020 to have a fixed size irrespective of the changed size of the focus region as in an example shown in FIG. 43(*b*). In another example, the controller 180 may control the size of the sub-playing window 2020 to be changed based on the changed size of the focus region as in an example shown in FIG. 43(*c*).

Figure 44:
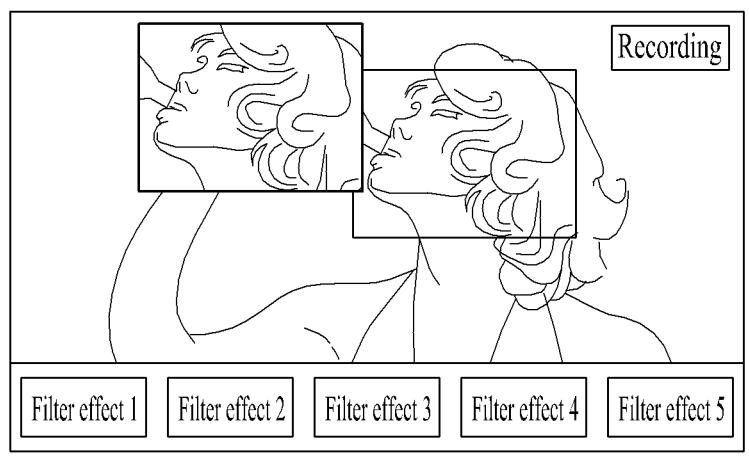
FIG. 44 is a diagram illustrating an example in which a camera effect is applied to at least one sub playing window.

The controller 180 may control a camera effect (or a camera filter) to be applied only to the sub-playing window. For example, FIG. 44 is a diagram illustrating an example in which a camera effect is applied to at least one sub-playing window. The controller 180 may control a camera effect list to be displayed that can be applied to at least one sub-playing window in response to predetermined user input as in an example shown in FIG. 44. Subsequently, the controller 180 may control a camera effect selected by the user to be applied to the sub-playing window.

On the other hand, the controller 180 may control the camera effect not to be applied to the sub-playing window but only to the main playing window. Alternatively, the controller 180 may control the camera effect to be applied to both the main playing window and the sub-playing window.

In a case in which two videos output through the main playing window and the sub-playing window are recorded, the controller 180 may store the video in the main playing window and the video in the sub-playing window as individual video files. Alternatively, the two video files may be combined into one video file, which may be stored.

Accordingly, embodiments of the present invention provide various effects and/or features.

Embodiments of the present invention have the effect of providing a mobile terminal with improved user convenience.

Specifically, embodiments of the present invention have the effect of providing a mobile terminal that provides a thumbnail enabling overall content of a video to be previewed.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a memory configured to store a video;
a display configured to display information;
a user input unit; and
a controller configured to:
select a plurality of video frames of the video to create a plurality of representative images;
create a representative thumbnail image of the video comprising the plurality of representative images;
cause the display to display the representative thumbnail image to correspond to the video, wherein the displayed representative thumbnail image comprises a play command region and a representative image region; and
execute predetermined functions corresponding to each of the play command region and the representative image region when each region is selected via the user input unit.

2. The mobile terminal according to claim 1, wherein the user input unit comprises a touch screen, wherein the controller is further configured to play the video in response to a touch input received at the play command region via the touch screen, wherein the video is played from a beginning point of the video or from a point where the video was previously stopped.

3. The mobile terminal according to claim 1, wherein the user input unit comprises a touch screen, wherein the controller is further configured to play the video starting from a point corresponding to a representative image selected by a touch input received via the touch screen.

4. The mobile terminal according to claim 3, wherein the controller is further configured to play only a portion of the video corresponding to the representative image.

5. The mobile terminal according to claim 1, wherein the user input unit comprises a touch screen, wherein the controller is further configured to cause the display to display a pop up window for performing communication with another party in response to a touch input received via the touch screen selecting a representative image corresponding to the another party.

6. A controlling method of a mobile terminal, comprising:
selecting a plurality of video frames of a video, wherein the plurality of video frames correspond to a period of the video in which at least one predetermined character appears;
creating a plurality of representative images from the plurality of video frames;
creating a representative thumbnail image of the video comprising the plurality of representative images; and
displaying the representative thumbnail image to correspond to the video.

7. The method of claim 6, wherein:
the plurality of video frames are selected from a highlight portion of the video; and
the highlight portion of the video is selected based on at least one criteria including a movement speed of a subject displayed in the video; an intensity of a sound reproduced in the video; and a brightness of one or more video frames of the video.

8. The method of claim 6, further comprising:
creating at least one of the plurality of representative images to comprise text converted from a portion of audio that corresponds to the video, wherein the portion of audio is reproduced at or around a corresponding video frame of the plurality of video frames in the video.

9. The method of claim 6, wherein the plurality of video frames is selected based on an appearance of a predetermined character in the plurality of video frames.

10. A mobile terminal comprising:
a memory configured to store a video;
a display configured to display information; and
a controller configured to:
select a plurality of video frames of the video, wherein the plurality of video frames correspond to a period of the video in which at least one predetermined character appears;
create a plurality of representative images from the plurality of video frames;
create a representative thumbnail image of the video comprising the plurality of representative images; and
cause the display to display the representative thumbnail image to correspond to the video.

11. The mobile terminal according to claim 10, wherein the controller is further configured to:
create the plurality of representative images based on a frequency of appearance of each of the at least one predetermined character or an appearance time of each of the at least one predetermined character.

12. The mobile terminal according to claim 10, wherein the controller is further configured to:
detect a previous event which occurred at the mobile terminal, wherein the event involved another party; and
select one of the plurality of video frames from a period of the video in which the another party is displayed.

13. The mobile terminal according to claim 12, wherein the at least one previous event comprises at least a telephone call, a transmission of a message, a scheduled event, or a transmission of information through a social network service.

14. The mobile terminal according to claim 10, wherein the controller is further configured to:
select a photograph related to the video depicting at least one person; and
select one of the plurality of video frames from a period of the video in which the at least one person is displayed.

15. The mobile terminal according to claim 14,
wherein the selected photograph is located before or after the video in a multimedia file list.

16. The mobile terminal according to claim 10, wherein the controller is further configured to select one of the plurality of video frames from a period of the video according to a keyword input by a user, wherein the keyword corresponds to a person displayed during the period of the video.

17. A mobile terminal comprising:
a memory configured to store a video;
a display configured to display information; and
a controller configured to:
select a plurality of video frames of the video to create a plurality of representative images;
create a representative thumbnail image of the video comprising the plurality of representative images;
cause the display to display the representative thumbnail image to correspond to the video;
detect a previous event which occurred at the mobile terminal, wherein the event involved another party; and
select one of the plurality of video frames from a period of the video in which the another party is displayed.

18. The mobile terminal according to claim 17, wherein the at least one previous event comprises at least a telephone call, a transmission of a message, a scheduled event, or a transmission of information through a social network service.

* * * * *